US012476688B2

(12) United States Patent
Xi et al.

(10) Patent No.: US 12,476,688 B2
(45) Date of Patent: Nov. 18, 2025

(54) GENERATING AND STEERING ORBITAL ANGULAR MOMENTUM BEAMS

(71) Applicant: QUALCOMM INCORPORATED, San Diego, CA (US)

(72) Inventors: Wei Xi, Beijing (CN); Yu Zhang, San Diego, CA (US); Hao Xu, Beijing (CN); Min Huang, Beijing (CN); Chao Wei, Beijing (CN); Changlong Xu, Beijing (CN); Liangming Wu, Beijing (CN); Chenxi Hao, Beijing (CN); Qiaoyu Li, Beijing (CN); Kangqi Liu, San Diego, CA (US); Jing Dai, Beijing (CN); Rui Hu, Beijing (CN); Jian Li, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 18/003,099

(22) PCT Filed: Aug. 19, 2020

(86) PCT No.: PCT/CN2020/109925
§ 371 (c)(1),
(2) Date: Dec. 22, 2022

(87) PCT Pub. No.: WO2022/036577
PCT Pub. Date: Feb. 24, 2022

(65) Prior Publication Data
US 2023/0261722 A1 Aug. 17, 2023

(51) Int. Cl.
*H04B 7/06* (2006.01)
*H01Q 3/26* (2006.01)
*H04B 7/08* (2006.01)

(52) U.S. Cl.
CPC .......... *H04B 7/06956* (2023.05); *H01Q 3/26* (2013.01); *H04B 7/086* (2013.01)

(58) Field of Classification Search
None
See application file for complete search history.

(56) References Cited

U.S. PATENT DOCUMENTS 10,511,092 B2 12/2019 Sajuyigbe et al.
2016/0156099 A1 6/2016 Kim et al.
(Continued)

FOREIGN PATENT DOCUMENTS

CN 103474776 A 12/2013
CN 108282208 A 7/2018
(Continued)

OTHER PUBLICATIONS

Supplementary European Search Report—EP20949789—Search Authority—Munich—Apr. 9, 2024.
(Continued)

*Primary Examiner* — Minh Trang T Nguyen
(74) *Attorney, Agent, or Firm* — Holland & Hart LLP/Qualcomm Incorporated

(57) ABSTRACT

Methods, systems, and devices for wireless communications are described. In some systems, a device may select antenna elements from a planar array to transmit or receive an orbital angular momentum (OAM) beam. The device may determine a first area (e.g., a first ring area) based on an angular direction over which the device can communicate an OAM beam with a second device and may determine a second area (e.g., a second ring area) on the planar array based on projecting the first area on the planar array. The device may select a set of antenna elements from the planar array that are located within the second area. The device may determine a complex-valued weight for each antenna element of the (Continued)

selected set of antenna elements and may transmit or receive an OAM beam to or from the second device via the set of antenna elements according to the angular direction.

42 Claims, 15 Drawing Sheets

(56) References Cited

U.S. PATENT DOCUMENTS

| | | | |
|---|---|---|---|
| 2017/0117626 A1 | 4/2017 | Sajuyigbe et al. | |
| 2017/0187442 A1 | 6/2017 | Luddy et al. | |
| 2019/0334609 A1* | 10/2019 | Alavi | H01Q 3/34 |
| 2020/0127709 A1* | 4/2020 | Klemes | H01P 5/222 |
| 2021/0013619 A1 | 1/2021 | Alkhateeb et al. | |
| 2024/0014553 A1* | 1/2024 | Yamada | H01Q 3/26 |

FOREIGN PATENT DOCUMENTS

| | | |
|---|---|---|
| CN | 110444903 A | 11/2019 |
| CN | 111276805 A | 6/2020 |
| JP | 2017153018 A | 8/2017 |
| JP | 6513590 B2 | 5/2019 |
| KR | 101718282 B1 | 3/2017 |

OTHER PUBLICATIONS

Zhao Y., et al., "Orbital Angular Momentum Beamforming for Index Modulation with Partial Arc Reception", Electronics Letters, Nov. 28, 2019, vol. 55, No. 24, 3 Pages.

International Search Report and Written Opinion—PCT/CN2020/109925—ISA/EPO—May 19, 2021.

* cited by examiner

GENERATING AND STEERING ORBITAL ANGULAR MOMENTUM BEAMS

FIELD OF TECHNOLOGY

The present application is a 371 national stage filing of International PCT Application No. PCT/CN2020/109925 by Xi et al. entitled "GENERATING AND STEERING ORBITAL ANGULAR MOMENTUM BEAMS," filed Aug. 19, 2020, which is assigned to the assignee hereof, and which is expressly incorporated by reference in its entirety herein."

FIELD OF TECHNOLOGY

The following relates to wireless communications, including generating and steering orbital angular momentum (OAM) beams.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support generating and steering orbital angular momentum (OAM) beams. Generally, the present disclosure describes techniques for selecting antenna elements from a group, such as a planar array, of antenna elements to steer an OAM beam and for loading a weight on at least some if not each of the selected antenna elements to communicate (e.g., transmit or receive) the OAM beam. In some examples, a device, which may be a base station or a user equipment (UE), may select one or more antenna elements from a group, such as a planar array, of antenna elements based on which antenna elements fall within an area on the planar array. The device may determine the area on the planar array based on an angular direction over which the device may communicate (e.g., transmit or receive) the OAM beam. For example, the device may determine a first area that is oriented at the angular direction from the planar array (e.g., in a plane that is perpendicular to the direction over which the device may transmit or receive the OAM beam), determine a second area based on a projection of the first area on the planar array, and select antenna elements from the planar array of antenna elements based on which antenna elements are located within the second area on the planar array. In some examples, the first and second areas may be ring areas, such as circular or elliptical ring areas. The device may determine a weight, which may be a complex-valued weight, for each selected antenna element based on a function of an OAM mode index and one or more spatial parameters associated with the selected antenna element, among other options.

A method of wireless communication at a first device is described. The method may include determining a first ring area based on an angular direction over which the first device can communicate with a second device using an OAM beam, where the angular direction is relative to a planar array including a set of antenna elements and the first ring area is oriented at the angular direction, selecting a set of antenna elements from the set of antenna elements based on the first ring area, and transmitting, to the second device, the OAM beam via the set of antenna elements according to the angular direction.

An apparatus for wireless communication at a first device is described. The apparatus may include a processor, memory coupled to the processor, and instructions stored in the memory. The instructions may be executable by the processor to cause the apparatus to determine a first ring area based on an angular direction over which the first device can communicate with a second device using an OAM beam, where the angular direction is relative to a planar array including a set of antenna elements and the first ring area is oriented at the angular direction, select a set of antenna elements from the set of antenna elements based on the first ring area, and transmit, to the second device, the OAM beam via the set of antenna elements according to the angular direction.

Another apparatus for wireless communication at a first device is described. The apparatus may include means for determining a first ring area based on an angular direction over which the first device can communicate with a second device using an OAM beam, where the angular direction is relative to a planar array including a set of antenna elements and the first ring area is oriented at the angular direction, selecting a set of antenna elements from the set of antenna elements based on the first ring area, and transmitting, to the second device, the OAM beam via the set of antenna elements according to the angular direction.

A non-transitory computer-readable medium storing code for wireless communication at a first device is described. The code may include instructions executable by a processor to determine a first ring area based on an angular direction over which the first device can communicate with a second device using an OAM beam, where the angular direction is relative to a planar array including a set of antenna elements and the first ring area is oriented at the angular direction, select a set of antenna elements from the set of antenna elements based on the first ring area, and transmit, to the second device, the OAM beam via the set of antenna elements according to the angular direction.

In some examples of the method, apparatuses, and non-transitory computer-readable medium described herein, selecting the set of antenna elements from the set of antenna elements may include operations, features, means, or instructions for determining a second ring area on the planar array based on a projection of the first ring area on the planar array, and selecting the set of antenna elements that may be located within the second ring area on the planar array.

In some examples of the method, apparatuses, and non-transitory computer-readable medium described herein, determining the second ring area on the planar array may include operations, features, means, or instructions for projecting the first ring area on the planar array based on the angular direction.

In some examples of the method, apparatuses, and non-transitory computer-readable medium described herein, selecting the set of antenna elements from the set of antenna elements further may include operations, features, means, or instructions for activating the set of antenna elements that may be located within the second ring area on the planar array, and deactivating a remainder of the set of antenna elements that may be located outside of the second ring area on the planar array.

In some examples of the method, apparatuses, and non-transitory computer-readable medium described herein, the angular direction may be equal to zero degrees, and where the second ring area includes a circular ring area.

In some examples of the method, apparatuses, and non-transitory computer-readable medium described herein, the angular direction may be equal to an angle different than zero degrees, and where the second ring area includes an elliptical ring area.

Some examples of the method, apparatuses, and non-transitory computer-readable medium described herein may further include operations, features, means, or instructions for determining a set of complex-valued weights for the set of antenna elements, each complex-valued weight of the set of complex-valued weights corresponding to one antenna element of the set of antenna elements and based on a function of an OAM mode index and one or more spatial parameters, and applying the set of complex-valued weights to the set of antenna elements, where transmitting the OAM beam via the set of antenna elements may be based on applying the set of complex-valued weights.

In some examples of the method, apparatuses, and non-transitory computer-readable medium described herein, the one or more spatial parameters may include the angular direction, a distance between a projected location of the antenna element on the first ring area and a center of the first ring area, an angle measured about the center of the first ring area from a reference line of the first ring area to the projected location of the antenna element on the first ring area, or a wavelength of a signal transmitted using the OAM beam.

In some examples of the method, apparatuses, and non-transitory computer-readable medium described herein, the first ring area may be defined by an area between a first circle associated with a first radius and a second circle associated with a second radius different than the first radius.

In some examples of the method, apparatuses, and non-transitory computer-readable medium described herein, the planar array includes a uniform planar array (UPA).

In some examples of the method, apparatuses, and non-transitory computer-readable medium described herein, the planar array includes a multi-antenna array or an intelligent surface.

A method of wireless communication at a first device is described. The method may include determining a first ring area based on an angular direction over which the first device can communicate with a second device using an OAM beam, where the angular direction is relative to a planar array including a set of antenna elements and the first ring area is oriented at the angular direction, selecting a set of antenna elements from the set of antenna elements based on the first ring area, and receiving, from the second device, the OAM beam via the set of antenna elements according to the angular direction.

An apparatus for wireless communication at a first device is described. The apparatus may include a processor, memory coupled to the processor, and instructions stored in the memory. The instructions may be executable by the processor to cause the apparatus to determine a first ring area based on an angular direction over which the first device can communicate with a second device using an OAM beam, where the angular direction is relative to a planar array including a set of antenna elements and the first ring area is oriented at the angular direction, select a set of antenna elements from the set of antenna elements based on the first ring area, and receive, from the second device, the OAM beam via the set of antenna elements according to the angular direction.

Another apparatus for wireless communication at a first device is described. The apparatus may include means for determining a first ring area based on an angular direction over which the first device can communicate with a second device using an OAM beam, where the angular direction is relative to a planar array including a set of antenna elements and the first ring area is oriented at the angular direction, selecting a set of antenna elements from the set of antenna elements based on the first ring area, and receiving, from the second device, the OAM beam via the set of antenna elements according to the angular direction.

A non-transitory computer-readable medium storing code for wireless communication at a first device is described. The code may include instructions executable by a processor to determine a first ring area based on an angular direction over which the first device can communicate with a second device using an OAM beam, where the angular direction is relative to a planar array including a set of antenna elements and the first ring area is oriented at the angular direction, select a set of antenna elements from the set of antenna elements based on the first ring area, and receive, from the second device, the OAM beam via the set of antenna elements according to the angular direction.

In some examples of the method, apparatuses, and non-transitory computer-readable medium described herein, selecting the set of antenna elements from the set of antenna elements may include operations, features, means, or instructions for determining a second ring area on the planar array based on a projection of the first ring area on the planar array, and selecting the set of antenna elements that may be located within the second ring area on the planar array.

In some examples of the method, apparatuses, and non-transitory computer-readable medium described herein, determining the second ring area on the planar array may include operations, features, means, or instructions for projecting the first ring area on the planar array based on the angular direction.

In some examples of the method, apparatuses, and non-transitory computer-readable medium described herein, selecting the set of antenna elements from the set of antenna elements further may include operations, features, means, or instructions for activating the set of antenna elements that may be located within the second ring area on the planar array, and deactivating a remainder of the set of antenna elements that may be located outside of the second ring area on the planar array.

In some examples of the method, apparatuses, and non-transitory computer-readable medium described herein, the angular direction may be equal to zero degrees, and where the second ring area includes a circular ring area.

In some examples of the method, apparatuses, and non-transitory computer-readable medium described herein, the angular direction may be equal to an angle different than zero degrees, and where the second ring area includes an elliptical ring area.

Some examples of the method, apparatuses, and non-transitory computer-readable medium described herein may further include operations, features, means, or instructions for determining a set of complex-valued weights for the set of antenna elements, each complex-valued weight of the set of complex-valued weights corresponding to one antenna element of the set of antenna elements and based on a function of an OAM mode index and one or more spatial parameters, and applying the set of complex-valued weights to the set of antenna elements, where receiving the OAM beam via the set of antenna elements may be based on applying the set of complex-valued weights.

In some examples of the method, apparatuses, and non-transitory computer-readable medium described herein, the one or more spatial parameters may include the angular direction, a distance between a projected location of the antenna element on the first ring area and a center of the first ring area, an angle measured about the center of the first ring area from a reference line of the first ring area to the projected location of the antenna element on the first ring area, or a wavelength of a signal received using the OAM beam.

In some examples of the method, apparatuses, and non-transitory computer-readable medium described herein, the first ring area may be defined by an area between a first circle associated with a first radius and a second circle associated with a second radius different than the first radius.

In some examples of the method, apparatuses, and non-transitory computer-readable medium described herein, the planar array includes a UPA.

In some examples of the method, apparatuses, and non-transitory computer-readable medium described herein, the planar array includes a multi-antenna array or an intelligent surface.

DETAILED DESCRIPTION

Figure 1:
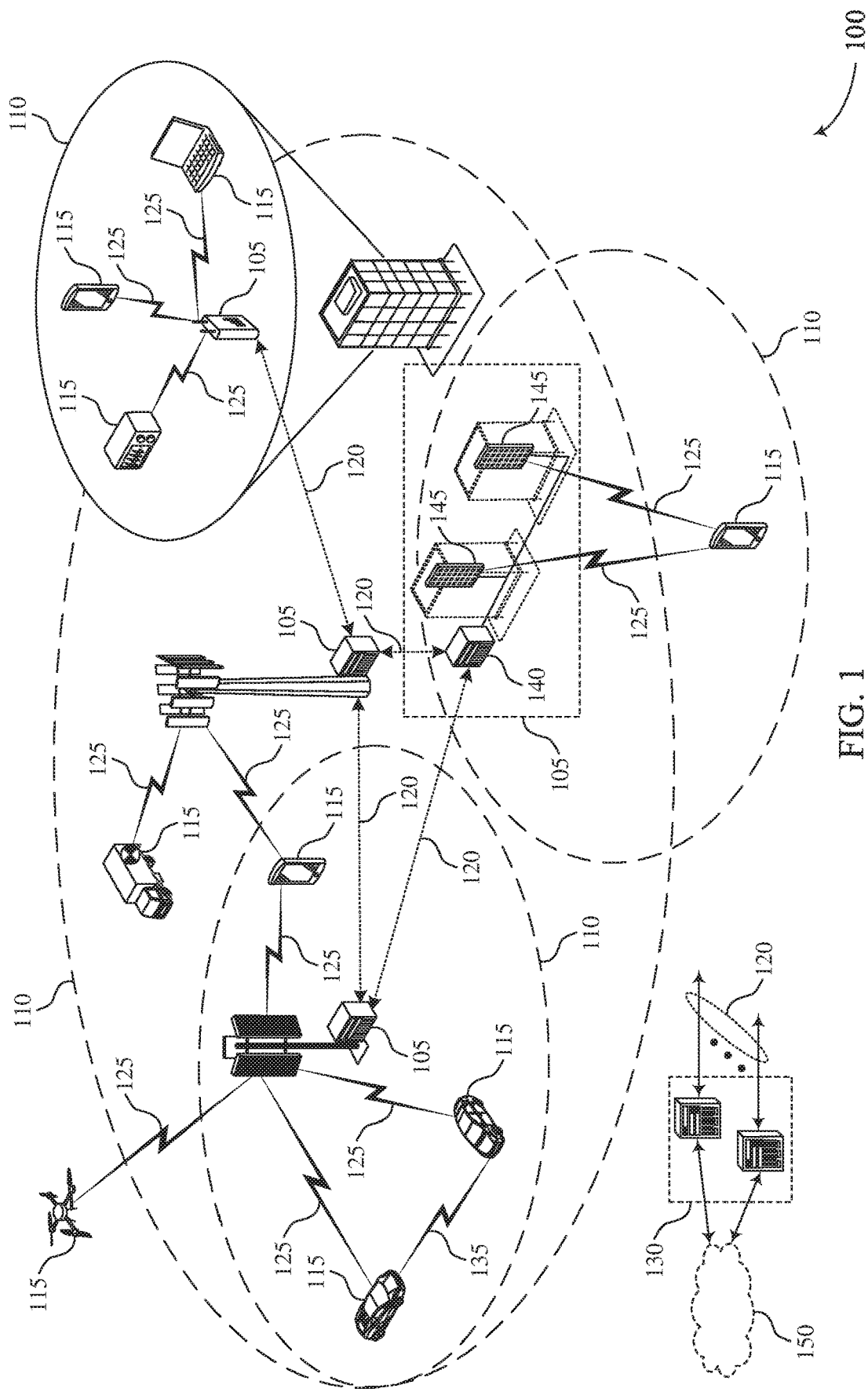
FIGS. 1 and 2 illustrate examples of wireless communications systems that support generating and steering orbital angular momentum (OAM) beams in accordance with aspects of the present disclosure.

In some wireless communications systems, wireless devices, such as base stations or user equipment (UE), or both, may communicate directionally, for example, using beams to orient communication signals over one or more directions. In some systems, such as in orbital angular momentum (OAM)-capable communications systems, the wireless devices may communicate using orbital angular momentum (OAM) beams, which, in addition to providing signal directionality, may also provide an additional dimension for signal or channel multiplexing. In some aspects, for example, such an additional dimension may include a state or a mode of the OAM beam, where different states or modes of OAM beams may be orthogonal to each other. As such, different OAM states or modes may be multiplexed together to increase the capacity of an OAM link. In some cases, a wireless device may use spiral phase plate (SPP) or uniform circular array (UCA) based methodologies to generate an OAM beam. In such use cases involving a SPP or a UCA to generate an OAM beam, however, a wireless device may experience limited beam steering capability, which may result in limited application and utilization of OAM-based communication.

In some implementations of the present disclosure, a wireless device may steer an OAM beam in a desired angular direction based on selecting antenna elements from a planar array of antenna elements that are located within a determined area on the planar array. In some examples, the wireless device may determine the area on the planar array based on the angular direction over which the wireless device may transmit or receive an OAM beam. Upon selecting antenna elements from the planar array, the wireless device may apply or load weights on at least some if not each of the selected antenna elements, on a per-element basis, based on an OAM mode index and a location of each of the selected antenna elements. For example, the wireless device may determine a weight for each selected antenna element based on inputting the OAM mode index and one or more angular or distance values associated with the selected antenna element into an antenna element weight function.

Particular aspects of the subject matter described herein may be implemented to realize one or more potential advantages. The described techniques may be implemented to realize greater steering ability of a wireless device for transmitting or receiving OAM beams. For example, based on implementing the described antenna element selection techniques, the wireless device may steer an OAM beam with greater freedom, which may result in the wireless device being able to communicate (e.g., transmit or receive) signaling with another wireless device using OAM beams with greater directionality. In other words, the wireless device may be able to more directionally transmit or receive an OAM beam based on implementing the described antenna element selection techniques. Further, based on a greater ability to steer an OAM beam and, likewise, to transmit or receive an OAM beam more directionally, the wireless device may experience increased reliability and a greater likelihood of successful communication. For example, based on transmitting or receiving an OAM beam more directionally, signaling carried by the OAM beam may be less susceptible to interference and the signaling carried by the OAM beam may be associated with a higher received power at a receiving device. Further, based on implementing the use of OAM beams, the wireless device may experience higher data rates and denser communication networks.

Aspects of the disclosure are initially described in the context of wireless communications systems. Aspects of the disclosure are additionally described in the context of a projection of an area on a planar array and antenna element selection procedures based on the determined areas on a planar array. Aspects of the disclosure are further illustrated by and described with reference to apparatus diagrams, system diagrams, and flowcharts that relate to generating and steering OAM beams.

FIG. 1 illustrates an example of a wireless communications system 100 that supports generating and steering OAM beams in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, the wireless communications system 100 may be an example of or otherwise support an OAM-based communications system and a base station 105 or a UE 115 may communicate via OAM beams. In some examples, a base station 105 or a UE 115 may generate and steer an OAM beam based on selecting a set of antenna elements from a planar array of antenna elements (e.g., a planar array on the base station 105 or the UE 115) based on which antenna elements fall within a determined area on the planar array. In some implementations, for example, the base station 105 or the UE 115 may determine a first area based on an angular direction, which may be referred to herein as θ and may be defined relative to the planar array, over which the base station 105 or the UE 115 can communicate with another wireless device using an OAM beam. In some aspects, the first area may be a theoretical area (e.g., may be used for computational purposes and may not physically exist) that is located in a plane that is perpendicular to the angular direction θ over which the base station 105 or the UE 115 can communicate using the OAM beam.

The base station 105 or the UE 115 may determine a second area based on a projection of the first area on the planar array. For example, the second area may be associated with a projection of the first area onto the planar array according to the angular direction θ. As such, the second area may be located on a plane that is co-planar with the planar array. The base station 105 or the UE 115, based on determining the second area on the planar array, may select antenna elements from planar array based on which antenna elements are located within the second area. For example, the base station 105 or the UE 115 may select antenna elements that fall within the second area and may refrain from selecting antenna elements that fall outside of the second area. Upon selecting the antenna elements from the planar array based on which antenna elements are located within the second area, the base station 105 or the UE 115 may transmit or receive the OAM beam via the selected antenna elements according to the angular direction θ.

Figure 2:
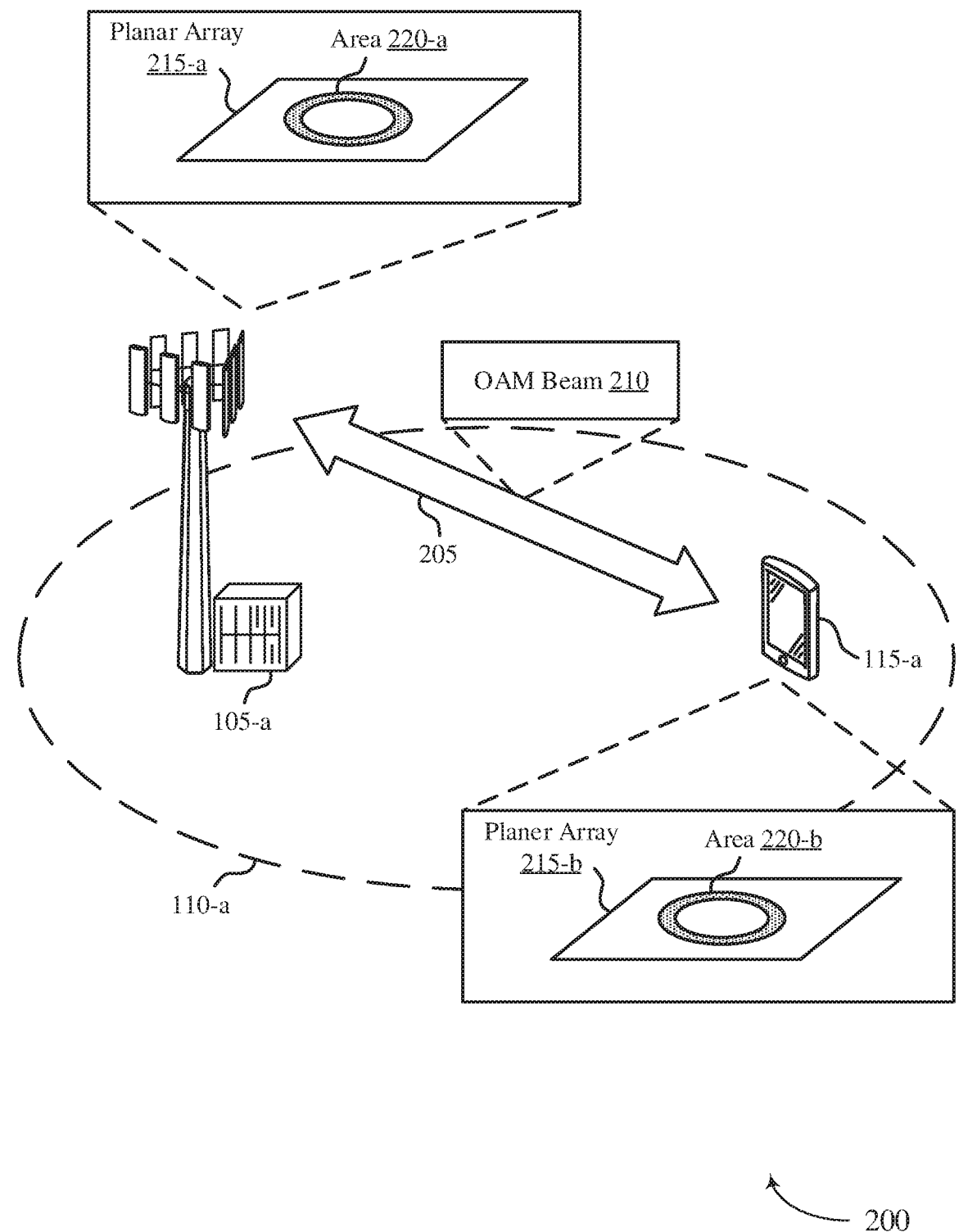

FIG. 2 illustrates an example of a wireless communications system 200 that supports generating and steering OAM beams in accordance with aspects of the present disclosure. In some examples, the wireless communications system 200 may implement aspects of wireless communications system 100. The wireless communications system 200 may illustrate communication between a base station 105-a and a UE 115-a, which may be examples of corresponding devices described herein. In some examples, the wireless communications system 200, which may be an example of a sixth generation (6G) system, may support OAM-based communications and, as such, the base station 105-a and the UE 115-a may transmit or receive OAM beams 210 over a communication link 205 (e.g., an OAM link 205) within a geographic coverage area 110-a.

For example, the base station 105-a or the UE 115-a may support OAM-based communication by using the OAM of electromagnetic waves to distinguish between different signals. The OAM of electromagnetic waves may be different than the spin angular momentum (SAM) of electromagnetic waves, and both may contribute to the overall angular momentum of an electromagnetic wave as defined in quantum mechanics by Equation 1, shown below.

$$J = \iiint r \times S\, dx\, dy\, dz = \Sigma + L \quad (1)$$

As shown in Equation 1, J is equal to the angular momentum of the electromagnetic wave, r is a position vector, S=E×H and is equal to the Poynting flux, where E is equal to the electric field vector and H is equal to the magnetic field's auxiliary field vector, Σ is equal to the SAM of the electromagnetic wave (and is sometimes alternatively denoted as S), and L is equal to the OAM of the electromagnetic wave. In some cases, the SAM of the electromagnetic wave may be associated with the polarization of the electromagnetic wave. For example, an electromagnetic wave may be associated with different polarizations (e.g., circular polarizations), such as left and right. Accordingly, the SAM of the electromagnetic wave may have multiple (e.g., two) degrees of freedom.

In some cases, the OAM of the electromagnetic wave may be associated with a field spatial distribution of the electromagnetic wave, which may be in the form of a helical or twisted wavefront shape (e.g., in examples in which a light beam can be associated with a helical or twisted wavefront). For example, an electromagnetic wave (e.g., a light beam) may be in a helical mode (which may also be referred to as an OAM mode) and such helical modes may be characterized by a wavefront that is shaped as a helix with an optical vortex in the center (e.g., at the beam axis), where each helical mode is associated with a different helical wavefront structure. The helical modes (e.g., OAM modes, which may also be referred to as OAM states) may be defined or referred to by a mode index m, where a sign of the mode index m corresponds to a "handedness" (e.g., left or right) of the helix (or helices) and a magnitude of the mode index m (e.g., |m|) corresponds to a quantity of distinct but interleaved helices of the electromagnetic wave.

For example, for an electromagnetic wave associated with an OAM mode index of m=0, the electromagnetic wave is not helical and the wavefronts of the electromagnetic wave are multiple disconnected surfaces (e.g., the electromagnetic wave is a sequence of parallel planes). For an electromagnetic wave associated with an OAM mode index of m=+1, the electromagnetic wave may propagate in a right-handed sense (e.g., has a right circular polarization or may be understood as having a clockwise circular polarization) and the wavefront of the electromagnetic wave may be shaped as a single helical surface with a step length equal to a wavelength λ of the electromagnetic wave. Likewise, the phase delay over one revolution of the electromagnetic wave may be equal to 2π. Similarly, for an OAM mode index of m=−1, the electromagnetic wave may propagate in a left-handed sense (e.g., has a left circular polarization or may be understood as having a counter-clockwise circular polarization) and the wavefront of the electromagnetic wave may be also be shaped as a single helical surface with a step length equal to the wavelength λ of the electromagnetic wave. Likewise, the phase delay over one revolution of the electromagnetic wave may be equal to −2π.

For further example, for an OAM mode index of m=±2, the electromagnetic wave may propagate in either a right-handed sense (if +2) or in a left-handed sense (if −2) and the wavefront of the electromagnetic wave may include two distinct but interleaved helical surfaces. In such examples, the step length of each helical surface may be equal to λ/2. Likewise, the phase delay over one revolution of the electromagnetic wave may be equal to +4π. In general terms, a mode-m electromagnetic wave may propagate in either a right-handed sense or a left-handed sense (depending on the sign of m) and may include m distinct but interleaved helical surfaces with a step length of each helical surface equal to λ/|m|. Likewise, the phase delay over one revolution of the electromagnetic wave may be equal to 2mπ. In some examples, an electromagnetic wave may be indefinitely extended to provide for an infinite number of degrees of freedom of the OAM of the electromagnetic wave (e.g., m=0, ±1, ±2, . . . , ±∞). As such, the OAM of the electromagnetic wave (e.g., L as defined in Equation 1) may be associated with infinite degrees of freedom.

In some examples, the OAM mode index m of an electromagnetic wave may correspond to or otherwise function as (e.g., be defined as) an additional dimension for signal or channel multiplexing. For example, each OAM mode or state (of which there may be infinite), may function similarly (e.g., or equivalently) to a communication channel, such as a sub-channel. In other words, an OAM mode or state (in a 6G system) may correspond to a communication channel (in a 5G system), and vice versa. For instance, the base station 105-a or the UE 115-a may communicate separate signals using electromagnetic waves having different OAM modes or states similarly to how the base station 105-a or the UE 115-a may transmit separate signals over different communication channels. In some aspects, such use of the OAM modes or states of an electromagnetic wave to carry different signals may be referred to as the use of OAM beams 210.

Additionally, in some examples, electromagnetic waves with different OAM modes (e.g., OAM states) may be mutually orthogonal to each other (e.g., in a Hilbert sense, in which a space may include an infinite set of axes and sequences may become infinite by way of always having another coordinate direction in which next elements of the sequence can go). Likewise, in a Hilbert sense, orthogonal OAM modes or states may correspond to orthogonal communication channels (e.g., orthogonal sequences transmitted over a communication channel) and, based on the potentially infinite number of OAM modes or states, the wireless communications system 200 employing the use of OAM beams 210 may theoretically achieve infinite capacity. For example, in theory, an infinite number of OAM states or modes may be twisted together for multiplexing and the capacity of the OAM link 205 can approach infinity while preserving orthogonality between signals carried by different OAM modes (e.g., indices).

In some cases, the base station 105-a or the UE 115-a may generate such OAM beams 210 using SPP or UCA methodologies. In cases in which the base station 105-a or the UE 115-a use an SPP methodology, for example, the base station 105-a or the UE 115-a may convert an electromagnetic wave associated with an OAM mode index m=0 (e.g., a non-helical electromagnetic wave associated with mode-zero OAM) into an electromagnetic wave associated with an OAM mode index m≠0 (e.g., a helical electromagnetic wave associated with non-zero OAM) based on passing the electromagnetic wave through an optical operator (e.g., a SPP). Such an optical operator may be associated with geometric constraints and may be able to generate an electromagnetic wave associated with a single OAM mode. In other words, the base station 105-a or the UE 115-a may use one SPP to generate one OAM mode of an OAM beam 210. As such, a base station 105-a or a UE 115-a may implement a different SPP for each OAM mode of an OAM beam 210 that the base station 105-a or the UE 115-a may transmit, which may be inefficient and consume costly amounts of memory and processing power at the base station 105-a or the UE 115-a. Further, the base station 105-a or the UE 115-a, implementing a SPP to generate an OAM beam 210, may be unable to transmit or receive an OAM beam 210 in a direction different than perpendicular to the plane in which the SPP is located.

In cases in which the base station 105-a or the UE 115-a uses a UCA methodology to generate an OAM beam 210, the base station 105-a or the UE 115-a may identify a set of antenna elements on a circular array of antenna elements and may load a weight to each of the identified antenna elements based on the OAM mode index m. For example, to generate an OAM beam 210 with an OAM mode index of m, the base station 105-a or the UE 115-a may load a weight to each antenna element on the UCA based on an angle measured between a reference line on the UCA (e.g., the x-axis of the plane on which the UCA is located, where the origin is at the center of the UCA) and the antenna element, the OAM mode index m, and i (e.g., for complex-valued weights, which may alternatively be denoted as j in some cases). In some cases, for instance, the weight for an antenna element n may be proportional to $e^{i*m*\varphi_n}$, where $\varphi_n$ is equal to the angle measured between the reference line on the UCA and the antenna element n.

For example, for m=0, the base station 105-a or the UE 115-a may determine that the weight of each antenna element is equal to 1, for m=1, the base station 105-a or the UE 115-a may determine that the weight of each antenna element n is equal to $e^{i*\varphi_n}$, for m=2 the base station 105-a or the UE 115-a may determine that the weight of each antenna element n is equal to $e^{i*2*\varphi_n}$, and so on. In some cases, however, the base station 105-a or the UE 115-a, implementing a UCA to generate an OAM beam 210, may be unable to transmit or receive an OAM beam 210 in a direction different than perpendicular to the plane in which the UCA is located. As such, the base station 105-a or the UE 115-a may have limited ability to steer an OAM beam 210 when using SPP or UCA methodologies, which may result in limited application or utilization of OAM beams 210.

In some implementations of the present disclosure, the base station 105-a or the UE 115-a may steer an OAM beam 210 in any desired angular direction, which may be referred to herein as θ, based on selecting antenna elements from a planar array 215 from an area 220 on the planar array 215. For example, the base station 105-a may select antenna elements from a planar array 215-a of the base station 105-a within an area 220-a on the planar array 215-a and may use the selected antenna elements to transmit or receive an OAM beam 210 to or from the UE 115-a. Similarly, the UE 115-a may select antenna elements from a planar array 215-b of the UE 115-a within an area 220-b on the planar array 215-b and may use the selected antenna elements to transmit or receive an OAM beam 210 to or from the base station 105-a. In some aspects, the planar array 215 may be an example of or otherwise function as a (massive or holographic) MIMO array or an intelligent surface.

Figure 3:
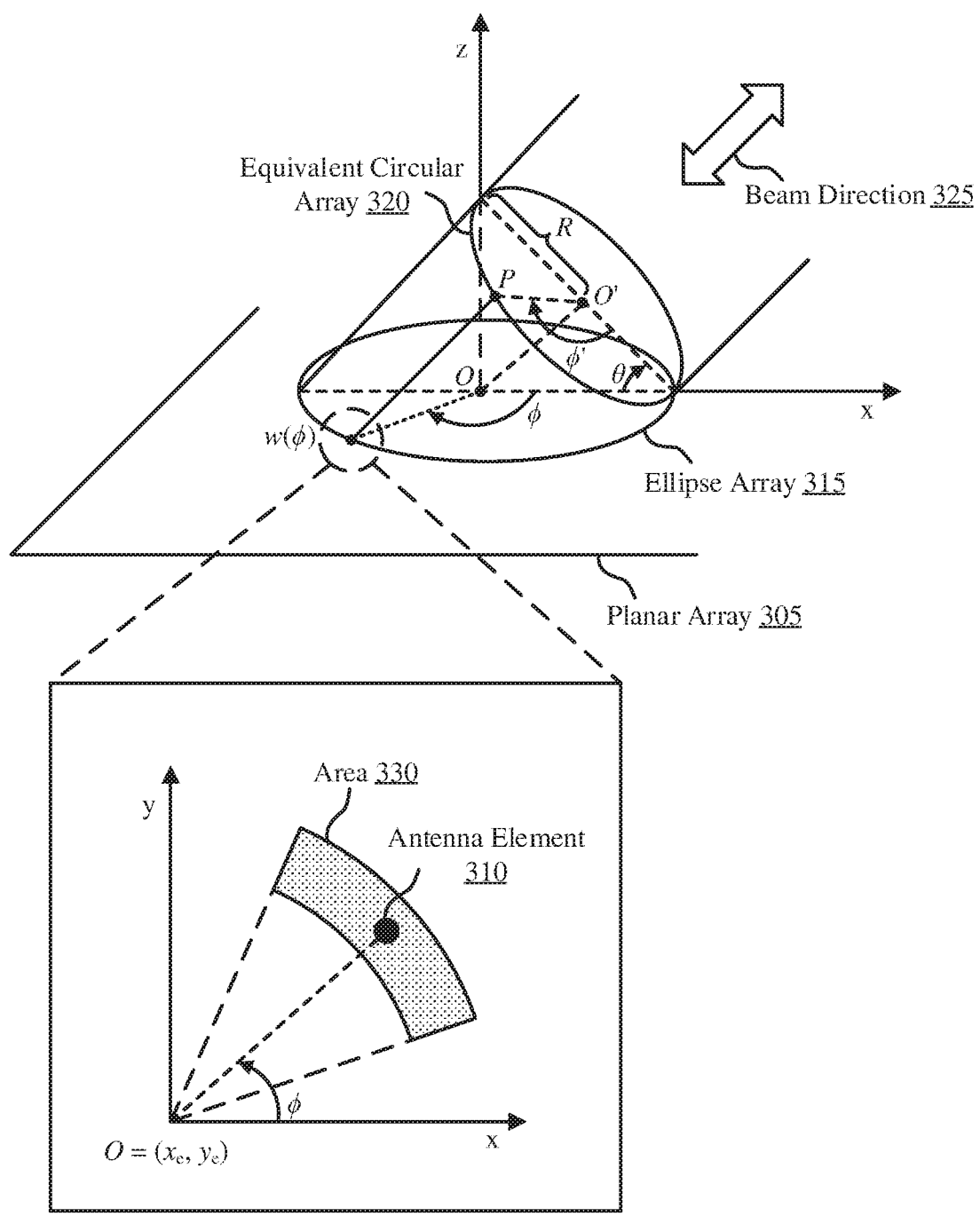
FIG. 3 illustrates an example of a projection that supports generating and steering OAM beams in accordance with aspects of the present disclosure.

In some examples, the base station 105-a or the UE 115-a may determine the area 220 on the planar array 215 based on the angular direction θ over which the base station 105-a or the UE 115-a can communicate (e.g., transmit or receive) an OAM beam 210. For example, the base station 105-a or the UE 115-a may determine a first area associated with an "equivalent" circular array and may determine the area 220 (e.g., a second area 220) based on projecting the first area on the planar array 215. In some examples, the base station 105-a or the UE 115-a may effectively use the first area associated with the equivalent circular array to generate the OAM beam 210 and may use the area 220 to steer the OAM beam 210. In some aspects, the first area may be located in a plane that is perpendicular to the angular direction θ over which the base station 105-a or the UE 115-a may transmit or receive the OAM beam 210 and the first area may be positioned such that a point (e.g., a single point) of the first area may be located in the plane that includes the planar array 215, as illustrated in FIG. 3. Although illustrated such that a point of the first area is located in the plane that includes the planar array 215, the first area may be positioned in any other way such that the first area is located in a plane that is perpendicular to the angular direction θ (e.g., a point of the first area may not intersect with the plane that includes the planar array 215 or multiple points of the first area may intersect with the plane that includes the planar array 215). As such, the base station 105-a or the UE 115-a may determine the area 220 on the planar array 215 based on projecting the first area on the planar array 215. Additional details relating to the projection of the first area associated with the equivalent circular array on the planar array 215 are described herein, including with reference to FIG. 3.

The base station 105-a or the UE 115-a, based on determining the area 220, may select a set of antenna elements from the planar array 215 based on which antenna elements are located within the area 220. For example, the base station 105-a or the UE 115-a may select antenna elements that are located within the area 220 and may refrain from selecting antenna elements that are located outside of the area 220. Additional details relating to the selection of the antenna elements from the planar array 215 are described herein, including with reference to FIG. 4. Upon selecting the set of antenna elements from the planar array 215, the base station 105-a or the UE 115-a may apply a weight to each of the selected antenna elements based on the OAM mode index m of the transmitted or received OAM beam 210 and one or more spatial parameters associated with each antenna element. Additionally, in some implementations, the weight applied to the set of selected antenna elements may be based on an attenuation loss function that may account for attenuation loss related to the distance over which the OAM beam is transmitted. Accordingly, the attenuation loss function may be equivalently referred to as a distance-dependent attenuation loss function. Additional details relating to the weight applied to each antenna element of the set of selected antenna elements are described herein, including with reference to FIG. 3.

Accordingly, the base station 105-a or the UE 115-a may transmit or receive the OAM beam 210 via the set of selected antenna elements that are located within the area 220 on the planar array 220 and based on the weights applied to each of the selected antenna elements. Further, although shown as between the base station 105-a and the UE 115-a, the base station 105-a or the UE 115-a, or both, may transmit or receive the OAM beam 210 to or from other wireless devices, such as peer devices. For example, the base station 105-a may transmit or receive an OAM beam 210 to or from another base station 105 and the UE 115-a may transmit or receive an OAM beam 210 to or from another UE 115 by implementing the described techniques without exceeding the scope of the present disclosure.

FIG. 3 illustrates an example of a projection 300 that supports generating and steering OAM beams in accordance with aspects of the present disclosure. In some examples, the projection 300 may be implemented to realize aspects of the wireless communications system 100 and the wireless communications system 200. For example, a base station 105 or a UE 115 may implement the projection 300 to determine an area from which the base station 105 or the UE 115 may select antenna elements 310 from a planar array 305 based on a beam direction 325 (which may be associated with an angular direction θ) over which the base station 105 or the UE 115 may transmit or a receive an OAM beam.

For example, the base station 105 or the UE 115 may determine an equivalent circular array 320 based on the beam direction 325 over which the base station 105 or the UE 115 may transmit or receive an OAM signal. In some aspects, the base station 105 or the UE 115 may determine the equivalent circular array 320 as a theoretical circular array from which the base station 105 or the UE 115 may (virtually or effectively) generate an OAM beam in a beam direction 325 (e.g., because the equivalent circular array may be perpendicular to the beam direction 325). As illustrated in FIG. 3, the equivalent circular array 320 may be associated with an origin O', a radius R, and may intersect the planar array 305 at a single point (illustrated on the x-axis for example). Additionally, based on being perpendicular to the beam direction 325, the equivalent circular array 320 may be angled relative the planar array 305 by the angular direction θ. In examples in which the base station 105 or the UE 115 receive the OAM beam, the angular direction θ may correspond to an azimuth angle of arrival (AoA) or a zenith angle of arrival (ZoA), or both. In examples in which the base station 105 or the UE 115 transmit the OAM beam, the angular direction may correspond to an azimuth angle of departure (AoD) or a zenith angle of departure (ZoD), or both.

In some implementations, the base station 105 or the UE 115 may project the equivalent circular array 320 on the planar array 305 and may determine an ellipse array 315 based on the projection. Further, although referred to as an ellipse, the ellipse array 315 may be other shapes without exceeding the scope of the present disclosure. For instance, in examples in which the beam direction 325 is perpendicular to the planar array 305 (e.g., such that the angular direction θ=0), the ellipse array 315 may be circular (if the equivalent circular array 320 is circular). Alternatively, in examples in which the beam direction 325 is not perpendicular to the planar array 305 (e.g., such that the angular direction θ #0), the ellipse array 315 may be elliptical.

As illustrated in FIG. 3, the ellipse array 315 may be located on the planar array 305 (e.g., may be co-planar with the planar array 305) and may be defined by $x^2(\cos\theta)^2+y^2=R^2$ (or, more generally, $(x-x_e)^2(\cos\theta)^2+(y-y_e)^2=R^2$). The base station 105 or the UE 115 may select antenna elements 310 from the planar array 305 based on determining which antenna elements 310 that are associated with coordinate locations on the planar array 305 that satisfy $x^2(\cos\theta)^2+y^2=R^2$ (or, more generally, $(x-x_e)^2(\cos\theta)^2+(y-y_e)^2=R^2$) and may use the selected antenna elements to generate an OAM beam according to a departure angle θ or to receive an OAM beam at an arrival angle θ.

Figure 4:
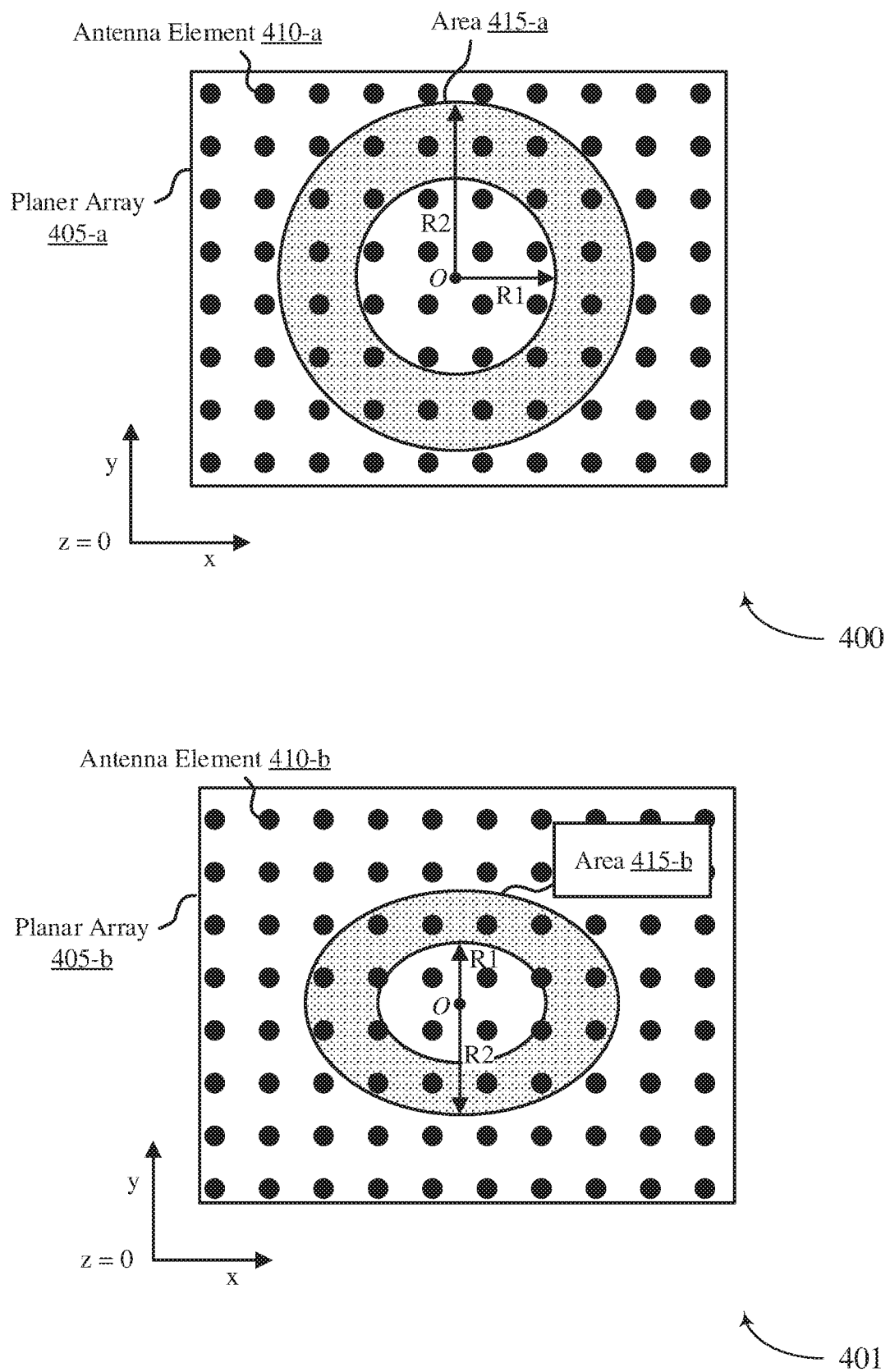
FIG. 4 illustrates example antenna element selection procedures that support generating and steering OAM beams in accordance with aspects of the present disclosure.

Further, as described herein, including with reference to FIG. 4, the ellipse array 315 may be associated with or otherwise include an area 330 (e.g., R may include a range of values bounded by a smaller radius R1 and a larger radius R2, such that R1≤R≤R2) and the base station 105 or the UE 115 may select antenna elements 310 from the planar array 315 that are located within the area 330 (e.g., a ring area 330 bounded by R1 and R2). For example, the equivalent circular array 320 may be associated with or include an area defined as the area between a first circle associated with a first radius R1 and a second circle associated with a second radius R2 and, accordingly, the projection of the ring area associated with the equivalent circular array 320 on the planar array 305 may likewise yield a ring area 330 bounded by R1 and R2. In such examples in which the ellipse array 315 is associated with or includes the area 330, the base station 105 or the UE 115 may select antenna elements that have coordinate locations that satisfy $R1 \leq x^2(\cos\theta)^2+y^2 \leq R2$.

For each selected antenna element 310, the base station 105 or the UE 115 may determine and apply a weight w, which may be a complex-valued weight, based on the OAM mode index m and one or more spatial parameters. For example, the base station 105 or the UE 115 may determine a weight for an antenna element 310 based on an antenna element weight function w(φ) of which the OAM mode index m and the one or more spatial parameters may be inputs. For example, the weight determined for the antenna element 310 may be based on the angle φ associated with the antenna element 310. As shown in FIG. 3, the antenna element 310 may have (x,y) coordinates of $$\left(x_e + \frac{R\cos\phi}{\sin\theta}, y_e + R\sin\phi\right)$$

and the antenna element 310 may be located at z=0. In some aspects, the angle φ may be measured about an origin O (e.g., which may have coordinates $(x_e, y_e)$) of the ellipse array 315 from a reference line (e.g., illustrated as the x-axis for example) of the ellipse array 315 to the antenna element 310. The function w(φ) may be defined according to Equation 2, as shown below:

$$w(\phi) = \frac{\alpha}{|h(x)|}\exp\left\{i\left[m\phi' + \frac{2\pi}{\lambda}d(\phi',\theta)\right]\right\} \qquad (2)$$

As shown in Equation 2, α may be a positive constant and h(x) may be an attenuation loss function (e.g., a distance-dependent attenuation loss function) and, for free-space propagation, $$h(x) = \frac{\beta}{4\pi x} \exp\left(-i\frac{2\pi}{\lambda}x\right),$$

where $\beta$ is a constant and $\lambda$ is the wavelength of the electromagnetic wave (e.g., the OAM beam). In some examples, the input x into the attenuation loss function h(x) may be the distance function d($\phi'$,$\theta$), which may be defined such that $d(\phi',\theta) \triangleq R(1+\cos\phi')\tan\theta$, where R may be a distance between a projected location P of the antenna element 310 on the equivalent circular array 320 and a center of the equivalent circular array 320 (e.g., O'). As such, the one or more spatial parameters may include one or more of the angular direction $\theta$, a distance R between the projected location P of the antenna element on the equivalent circular array 320 and a center of the equivalent circular array 320 (e.g., O'), an angle $\phi'$ measured about the center O' of the equivalent circular array 320 from a reference line of the equivalent circular array 320 (e.g., a diameter drawn from where the equivalent circular array 320 intersects the x-axis to where the equivalent circular array 320 intersects the z-axis) to the projected location P of the antenna element on the equivalent circular array 320, and a wavelength $\lambda$ of the electromagnetic wave (e.g., the OAM beam) carrying the signal.

In some aspects, the $$\frac{\alpha}{|h(x)|}$$

term in Equation 2 may be optional and, as such, may or may not be included in the calculation of the weight for the antenna element 310. For example, w($\phi$) may be determined according to $$w(\phi) = \exp\left\{i\left[m\phi' + \frac{2\pi}{\lambda}d(\phi',\theta)\right]\right\}.$$

Additionally, the base station 105 or the UE 115 may determine the weight for the antenna element 310 based the relationship between $\phi$, $\phi'$, and $\theta$, as shown in Equation 3 below:

$$\cos\phi = \frac{\cos\phi'}{\sqrt{(\cos\theta)^2 + (\sin\theta)^2(\cos\phi')^2}} \quad (3)$$

Further, although described and illustrated in the context of determining a weight for a single antenna element 310, the base station 105 or the UE 115 may similarly determine a weight for each of the selected antenna elements based on the OAM mode index m and one or more spatial parameters associated with each respective antenna element 310. Upon determining the weights (e.g., the complex-valued weights) for each of the selected antenna elements 310 on a per-antenna element basis, the base station 105 or the UE 115 may apply or load the determined weights to each of the selected antenna elements 310 and may transmit or receive an OAM beam based on applying or loading the weights.

FIG. 4 illustrates example antenna selection procedures 400 and 401 that support generating and steering OAM beams in accordance with aspects of the present disclosure. In some examples, the antenna selection procedures 400 and 401 may be implemented to realize aspects of the wireless communications system 100 and the wireless communications system 200. For example, a base station 105 or a UE 115 may implement one of the antenna selection procedure 400 or the antenna selection procedure 401 to select antenna elements 410 from a planar array 405 that are located within an area 415 on the planar array 405. In some aspects, the planar array 405 may be an example of a uniform planar array (UPA), such as a MIMO array (e.g., a massive or holographic MIMO array or a multi-antenna array) or an intelligent surface of antenna elements 410. Further, although the antenna elements 410 are shown as being distributed (e.g., uniformly distributed) on the planar array 405 in a square-like pattern, the antenna elements 410 may be distributed on the planar array 405 in any pattern, such as in a triangle-like pattern, without exceeding the scope of the present disclosure.

As described in more detail herein, including with reference to FIGS. 2 and 3, the base station 105 or the UE 115 may determine the area 415 based on projecting a first area (e.g., a first ring area, a first elliptical area, or another area shape) on the planar array 405, where the first area is located on a plane that is perpendicular to the angular direction $\theta$. In examples in which the first area is a first ring area, the first ring area may be defined as the area between a first circle associated with a first radius R1 and a second circle associated with a second radius R2. In some aspects, the first radius R1 may be less than the second radius R2. As such, the projection of the first ring area on the planar array 405 may result in a circular ring area 415-a that is bounded by an inner circle associated with the first radius R1 and an outer circle associated with the second radius R2 (e.g., in examples in which the angular direction $\theta$ over which the base station 105 or the UE 115 may transmit or receive an OAM beam is equal to zero) or an elliptical ring area 415-b that is bounded by an inner ellipse associated with a semi-minor axis R1 and an outer ellipse associated with a semi-minor axis R2 (e.g., in examples in which the angular direction $\theta$ over which the base station 105 or the UE 115 may transmit or receive an OAM beam is not equal to zero).

Accordingly, in examples in which the angular direction $\theta$ over which the base station 105 or the UE 115 may transmit or receive an OAM beam is equal to zero, the base station 105 or the UE 115 may implement the antenna selection procedure 400 and select antenna elements 410-a from a planar array 405-a based on determining which antenna elements 410-a are located within the circular ring area 415-a. For example, the base station 105 or the UE 115 may select antenna elements 410-a that are inside of a circle defined by a radius of R2 and outside of a circle defined by a radius of R1 and may refrain from selecting antenna elements 410-a that are outside of the circle defined by the radius of R2 or inside of the circle defined by the radius of R1. Alternatively, in examples in which the angular direction $\theta$ over which the base station 105 or the UE 115 may transmit or receive an OAM beam is equal to an angle different than zero, the base station 105 or the UE 115 may implement the antenna selection procedure 401 and select antenna elements 410-b from a planar array 405-b based on determining which antenna elements 410-b are located within the elliptical ring area 415-b. For example, the base station 105 or the UE 115 may select antenna elements 410-b that are inside of an ellipse defined by a semi-minor axis of R2 and outside of an ellipse defined by a semi-minor axis of R1 and may refrain from selecting antenna elements 410-b that are outside of the ellipse defined by the semi-minor axis of R2 or inside of the ellipse defined by the semi-minor axis of R1. Further, although described in the context of a circular ring area 415-*a* and an elliptical ring area 415-*b*, the base station 105 or the UE 115 may implement similar antenna selection procedures to select antenna elements 410 from differently shaped areas 415 on the planar array 405 without exceeding the scope of the present disclosure.

In some examples, selecting the set of antenna elements 410 that are located within the area 415 may include activating the set of antenna elements 410 that are located within the area 415 and deactivating (e.g., turning off) a remainder of the antenna elements 410 on the planar array 405 that are located outside of the area 415. As such, the base station 105 or the UE 115 may use the activated antenna elements 410 to transmit or receive an OAM beam and may refrain from using any of the deactivated antenna elements 410. Upon activating the set of selected antenna elements 410, the base station 105 or the UE 115 may apply a weight, such as a complex-valued weight, to at least some of if not each of the activated antenna elements 410 on a per-element basis. Additional details relating to the determination and application or loading of the per-element weights are described herein, including with reference to FIG. 3.

Figure 5:
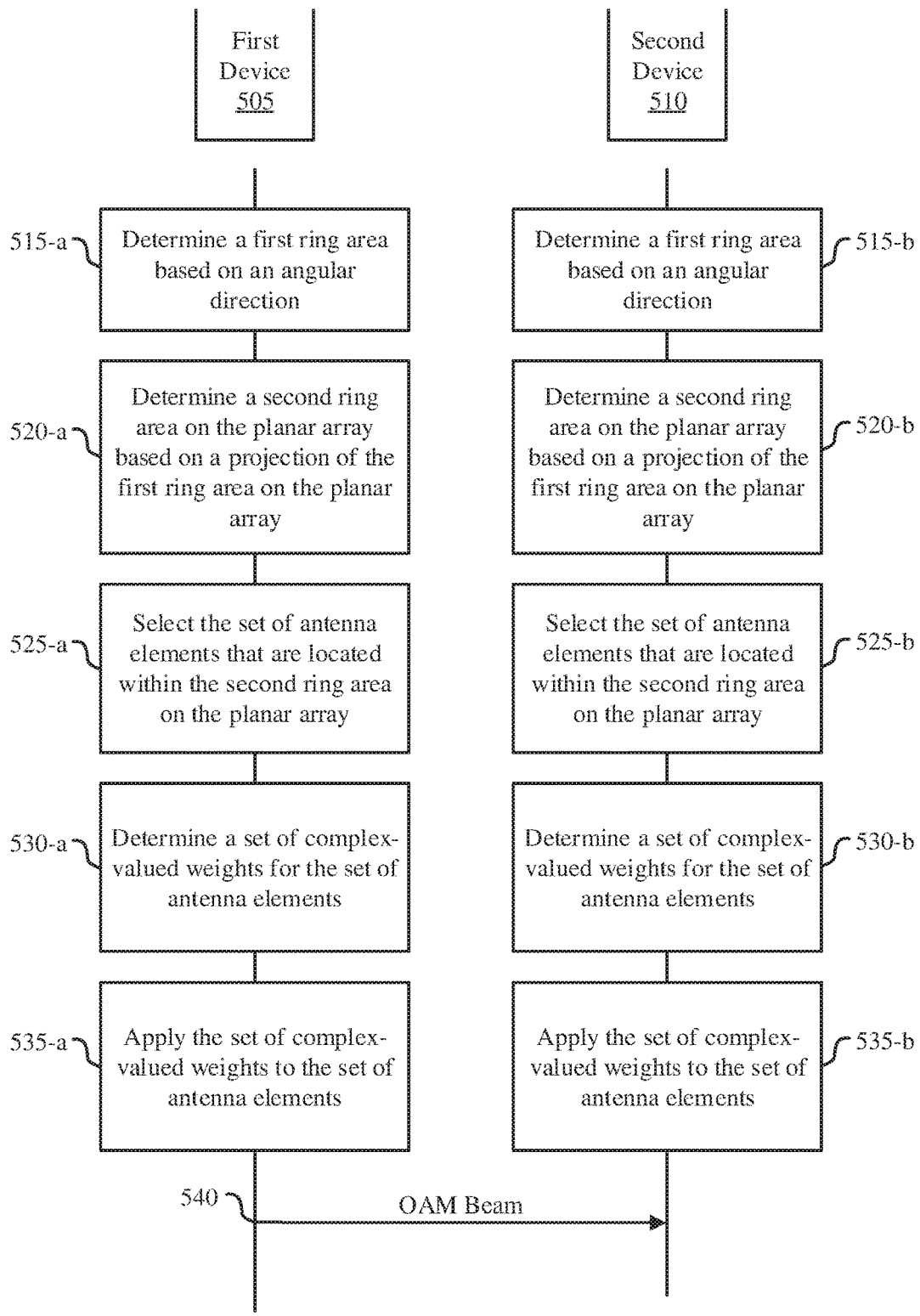
FIG. 5 illustrates an example of process flow that supports generating and steering OAM beams in accordance with aspects of the present disclosure.

FIG. 5 illustrates an example of a process flow 500 that supports generating and steering OAM beams in accordance with aspects of the present disclosure. In some examples, the process flow 500 may implement aspects of the wireless communications system 100 or the wireless communications system 200. The process flow 500 may illustrate OAM-based communication between a first device 505 and a second device 510, which may be examples of other devices described herein, such as base stations 105 or UEs 115. In some examples, the first device 505 and the second device 510 may each select a set of antenna elements from a respective planar arrays of antenna elements based on an angular direction θ over which the first device 505 may transmit an OAM beam to the second device 510. Alternative examples of the process flow may be implemented, in which some features are performed in a different order than described or are not performed at all. In some examples, operations may include additional features not mentioned below, or further operations may be added.

At 515-*a* and 515-*b*, the first device 505 and the second device 510 may determine a first ring area based on an angular direction (e.g., θ) over which the first device 505 and the second device 510 can communicate using an OAM beam. In some aspects, the angular direction is relative to a planar array of antenna elements (at each respective device) and the first ring area may be oriented at the angular direction. For example, the first ring area may be located in a plane that is perpendicular to the angular direction.

At 520 and 525, the first device 505 and the second device 510 may each select a set of antenna elements from the antenna elements on their respective planar arrays based on the first ring area. For example, at 520-*a* and 520-*b*, the first device 505 and the second device 510 may each determine a second ring area on the planar array based on a projection of the first ring area on the planar array. For example, the first device 505 and the second device 510 may each project the first ring area on their respective planar arrays based on the angular direction at which the first ring area is oriented relative to the planar arrays.

At 525-*a* and 525-*b*, the first device 505 and the second device 510 may each select the set of antenna elements that are located within the second ring area on their respective planar arrays. In some examples, the first device 505 and the second device 510 may each activate the selected set of antenna elements and deactivate a remainder of the antenna elements that are located outside of the second ring area on their respective planar arrays. Additional details relating to how the first device 505 and the second device 510 may each select the set of antenna elements from the second ring area are described herein, including with reference to FIG. 4.

At 530-*a* and 530-*b*, the first device 505 and the second device 510 may each determine a set of complex-valued weights for the set of antenna elements, each complex-valued weight of the set of complex-valued weights corresponding to one antenna element of the set of antenna elements and based on a function of an OAM mode index (e.g., an OAM mode index m) and one or more spatial parameters. For example, the first device 505 and the second device 510 may determine the set of complex-valued weights on a per-antenna element basis. In some examples, the function may be referred to as w(ϕ) and may be defined according to Equation 2. In some aspects, the one or more spatial parameters may include one or more of the angular direction θ, a distance R between a projected location P of the antenna element on the first ring area (e.g., as shown in FIG. 3) and a center of the first ring area O', an angle ϕ' measured about the center of the first ring area O' from a reference line of the first ring area (e.g., a diameter of the first ring area drawn from where the first ring area intersects the x-axis to where the first ring area intersects the z-axis, as shown in FIG. 3) to the projected location P of the antenna element on the first ring area, and a wavelength λ of the signal transmitted or received using the OAM beam (e.g., the wavelength λ of the electromagnetic wave carrying the signal). In some implementations, the one or more spatial parameters may additionally include an attenuation loss function h(x). Additional details relating to how the first device 505 and the second device 510 may determine the set of complex-valued weights are described herein, including with reference to FIG. 3.

At 535-*a* and 535-*b*, the first device 505 and the second device 510 may each apply the set of complex-valued weights to their respective selected set of antenna elements. In some examples, applying the set of complex-valued weights to the set of antenna elements may be equivalently referred to as loading the set of complex-valued weights to the set of antenna elements. In some examples, the set of complex-valued weights may play a role similar to that of a precoder in a MIMO transmission. For example, each weight is multiplied with the quantity to-be-weighted corresponding to the antenna elements. For instance, the first device 505, on the transmitting side, may apply the set of complex-valued weights to the selected set of antenna elements based on multiplying (e.g., weighting) the information symbol to be transmitted and carried by the OAM mode (e.g., index) by the per-antenna element weight and mapping the product to the selected antenna elements prior to final transmission. The second device 510, on the receiving side, may apply the set of complex-valued weights to the selected set of antenna elements based on multiplying (e.g., weighting) the received signals at the selected antenna elements by the per-antenna element weights. The second device 510 may determine a summation (e.g., may operate a summation) on the post-weighting values to detect the information symbol.

At 540, the first device 505 may transmit, to the second device 510, an OAM beam via the set of antenna elements selected by the first device 505 according to the angular direction. Likewise, the second device 510 may receive, from the first device 505, the OAM beam via the OAM beam via the set of antenna elements selected by the second device 510 according to the angular direction. In some examples, the first device 505 and the second device 510 may transmit and receive the OAM based on applying the set of complex-valued weights to their respectively selected set of antenna elements.

Further, although the process flow 500 illustrates both the first device 505 and the second device 510 performing the described operations, in some examples, the first device 505 or the second device 510, and not both, may perform the described operations without exceeding the scope of the present disclosure.

Figure 6:
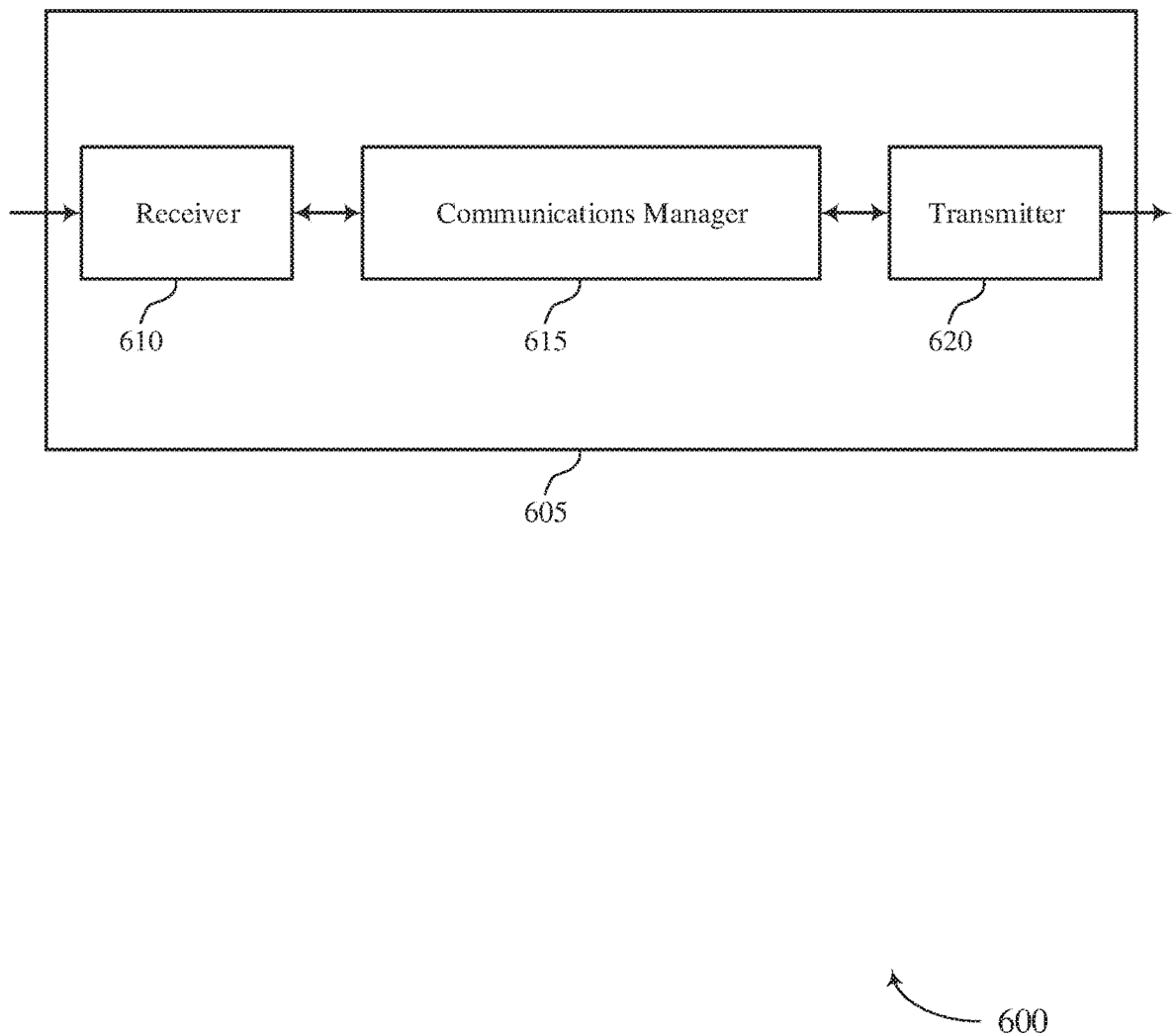
FIGS. 6 and 7 show block diagrams of devices that support generating and steering OAM beams in accordance with aspects of the present disclosure.

FIG. 6 shows a block diagram 600 of a device 605 that supports generating and steering OAM beams in accordance with aspects of the present disclosure. The device 605 may be an example of aspects of a device as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to generating and steering OAM beams, etc.). Information may be passed on to other components of the device 605. The receiver 610 may be an example of aspects of the transceiver 920 described with reference to FIG. 9. The receiver 610 may utilize a single antenna or a set of antennas.

In some implementations, the communications manager 615 may determine a first ring area based on an angular direction over which the first device can communicate with a second device using an OAM beam, where the angular direction is relative to a planar array including a set of antenna elements and the first ring area is oriented at the angular direction, select a set of antenna elements from the set of antenna elements based on the first ring area, and transmit, to the second device, the OAM beam via the set of antenna elements according to the angular direction.

In some other implementations, the communications manager 615 may determine a first ring area based on an angular direction over which the first device can communicate with a second device using an OAM beam, where the angular direction is relative to a planar array including a set of antenna elements and the first ring area is oriented at the angular direction, select a set of antenna elements from the set of antenna elements based on the first ring area, and receive, from the second device, the OAM beam via the set of antenna elements according to the angular direction. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 may be implemented as an integrated circuit or chipset for a mobile device modem, and the receiver 610 and the transmitter 620 may be implemented as analog components (e.g., amplifiers, filters, antennas) coupled with the mobile device modem to enable wireless transmission and reception over one or more bands.

The communications manager 615 as described herein may be implemented to realize one or more potential advantages. In some implementations, the communications manager 615 may be capable of transmitting or receiving an OAM beam with greater directionality based on selecting a set of antenna elements from a planar array based on a projection of a first ring area on the planar array. As such, the communications manager 615 may be associated with a greater likelihood for successful communication (e.g., either a greater likelihood for successful reception of an OAM beam transmitted by the device 605 at another device or a greater likelihood for successful reception of an OAM at the device 605) based on achieving greater directionality in OAM-based communication. For example, based on achieving greater directionality in OAM-based communication, an OAM beam may be less susceptible to interference and path loss.

Further, based on a greater likelihood for successful communication, the device 605 may potentially communicate with other devices more efficiently, such as perform fewer retransmissions, which may allow the communications manager 615 to turn off one or more processing components of the device 605 more frequency or for longer durations, or both. Accordingly, the device 605 may experience improved power savings and longer battery life.

Figure 7:
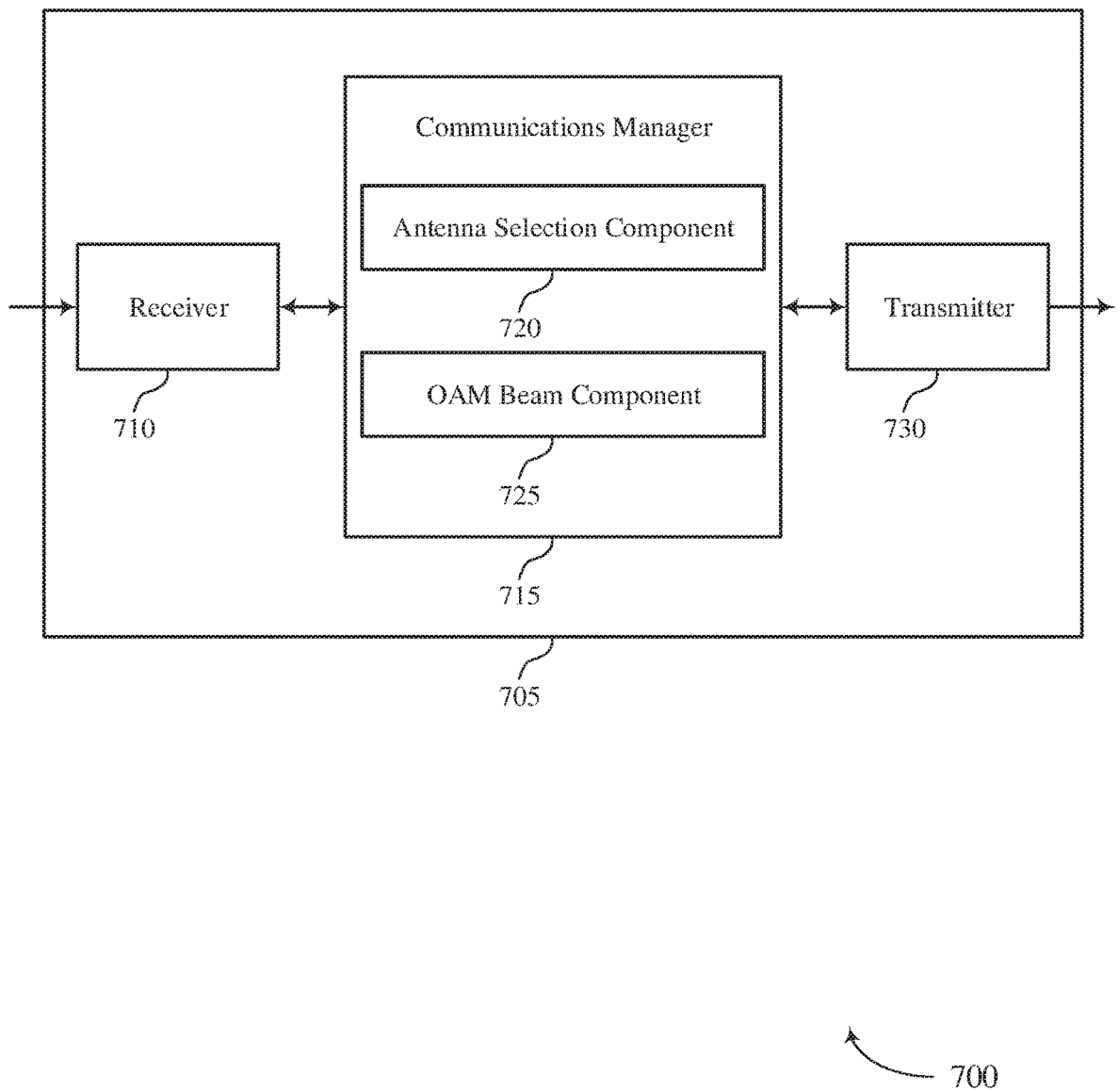

FIG. 7 shows a block diagram 700 of a device 705 that supports generating and steering OAM beams in accordance with aspects of the present disclosure. The device 705 may be an example of aspects of a device 605 or a device 115 as described herein. The device 705 may include a receiver 710, a communications manager 715, and a transmitter 730. The device 705 may also include a processor. Each of these components may be in communication with one another (e.g., via one or more buses).

The receiver 710 may receive information such as packets, user data, or control information associated with various information channels (e.g., control channels, data channels, and information related to generating and steering OAM beams, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an antenna selection component 720 and an OAM beam component 725. The communications manager 715 may be an example of aspects of the communications manager 910 described herein.

In some implementations, the communication manager 715 may transmit an OAM beam. In such implementations, the antenna selection component 720 may determine a first ring area based on an angular direction over which the first device can communicate with a second device using an OAM beam, where the angular direction is relative to a planar array including a set of antenna elements and the first ring area is oriented at the angular direction, and select a set of antenna elements from the set of antenna elements based on the first ring area. The OAM beam component 725 may transmit, to the second device, the OAM beam via the set of antenna elements according to the angular direction.

In some other implementations, the communications manager 715 may receive an OAM beam. In such implementations, the antenna selection component 720 may determine a first ring area based on an angular direction over which the first device can communicate with a second device using an OAM beam, where the angular direction is relative to a planar array including a set of antenna elements and the first ring area is oriented at the angular direction, and select a set of antenna elements from the set of antenna elements based on the first ring area. The OAM beam component 725 may receive, from the second device, the OAM beam via the set of antenna elements according to the angular direction.

The transmitter 730 may transmit signals generated by other components of the device 705. In some examples, the transmitter 730 may be collocated with a receiver 710 in a transceiver module. For example, the transmitter 730 may be an example of aspects of the transceiver 920 described with reference to FIG. 9. The transmitter 730 may utilize a single antenna or a set of antennas.

Figure 8:
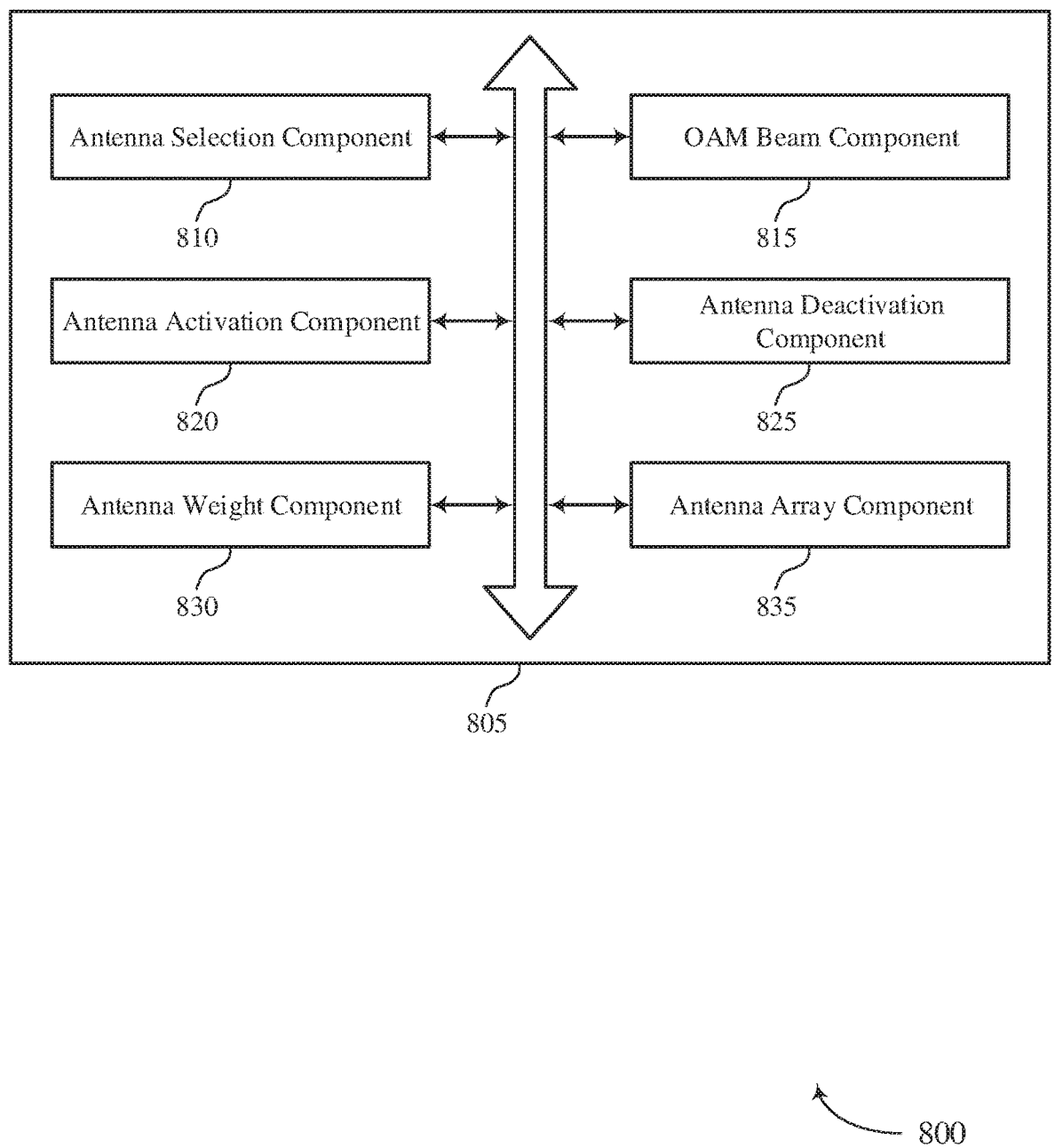
FIG. 8 shows a block diagram of a communications manager that supports generating and steering OAM beams in accordance with aspects of the present disclosure.

FIG. 8 shows a block diagram 800 of a communications manager 805 that supports generating and steering OAM beams in accordance with aspects of the present disclosure. The communications manager 805 may be an example of aspects of a communications manager 615, a communications manager 715, or a communications manager 910 described herein. The communications manager 805 may include an antenna selection component 810, an OAM beam component 815, an antenna activation component 820, an antenna deactivation component 825, an antenna weight component 830, and an antenna array component 835. Each of these modules may communicate, directly or indirectly, with one another (e.g., via one or more buses).

The antenna selection component 810 may determine a first ring area based on an angular direction over which the first device can communicate with a second device using an OAM beam, where the angular direction is relative to a planar array including a set of antenna elements and the first ring area is oriented at the angular direction. In some examples, the antenna selection component 810 may select a set of antenna elements from the set of antenna elements based on the first ring area.

In some examples, the antenna selection component 810 may determine a second ring area on the planar array based on a projection of the first ring area on the planar array. In some examples, the antenna selection component 810 may select the set of antenna elements that are located within the second ring area on the planar array. In some examples, the antenna selection component 810 may project the first ring area on the planar array based on the angular direction.

In some cases, the angular direction is equal to zero degrees, and where the second ring area includes a circular ring area. In some cases, the angular direction is equal to an angle different than zero degrees, and where the second ring area includes an elliptical ring area. In some cases, the first ring area is defined by an area between a first circle associated with a first radius and a second circle associated with a second radius different than the first radius.

In some examples, the OAM beam component 815 may transmit, to the second device, the OAM beam via the set of antenna elements according to the angular direction. In some other examples, the OAM beam component 815 may receive, from the second device, the OAM beam via the set of antenna elements according to the angular direction.

The antenna activation component 820 may activate the set of antenna elements that are located within the second ring area on the planar array. The antenna deactivation component 825 may deactivate a remainder of the set of antenna elements that are located outside of the second ring area on the planar array.

The antenna weight component 830 may determine a set of complex-valued weights for the set of antenna elements, each complex-valued weight of the set of complex-valued weights corresponding to one antenna element of the set of antenna elements and based on a function of an OAM mode index and one or more spatial parameters. In some examples, the antenna weight component 830 may apply the set of complex-valued weights to the set of antenna elements, where transmitting the OAM beam via the set of antenna elements is based on applying the set of complex-valued weights.

In some cases, the one or more spatial parameters may include one or more of the angular direction, a distance between a projected location of the antenna element on the first ring area and a center of the first ring area, an angle measured about the center of the first ring area from a reference line of the first ring area to the projected location of the antenna element on the first ring area, or a wavelength of a signal transmitted using the OAM beam. In some cases, the one or more spatial parameters may further include an attenuation loss function. For example, the attenuation loss function may be an optional component of the function used to determine the set of complex-valued weights.

The antenna array component 835 may include antenna elements that are distributed across the antenna array. In some cases, the planar array includes a UPA. In some cases, the planar array includes a multi-antenna array or an intelligent surface.

Figure 9:
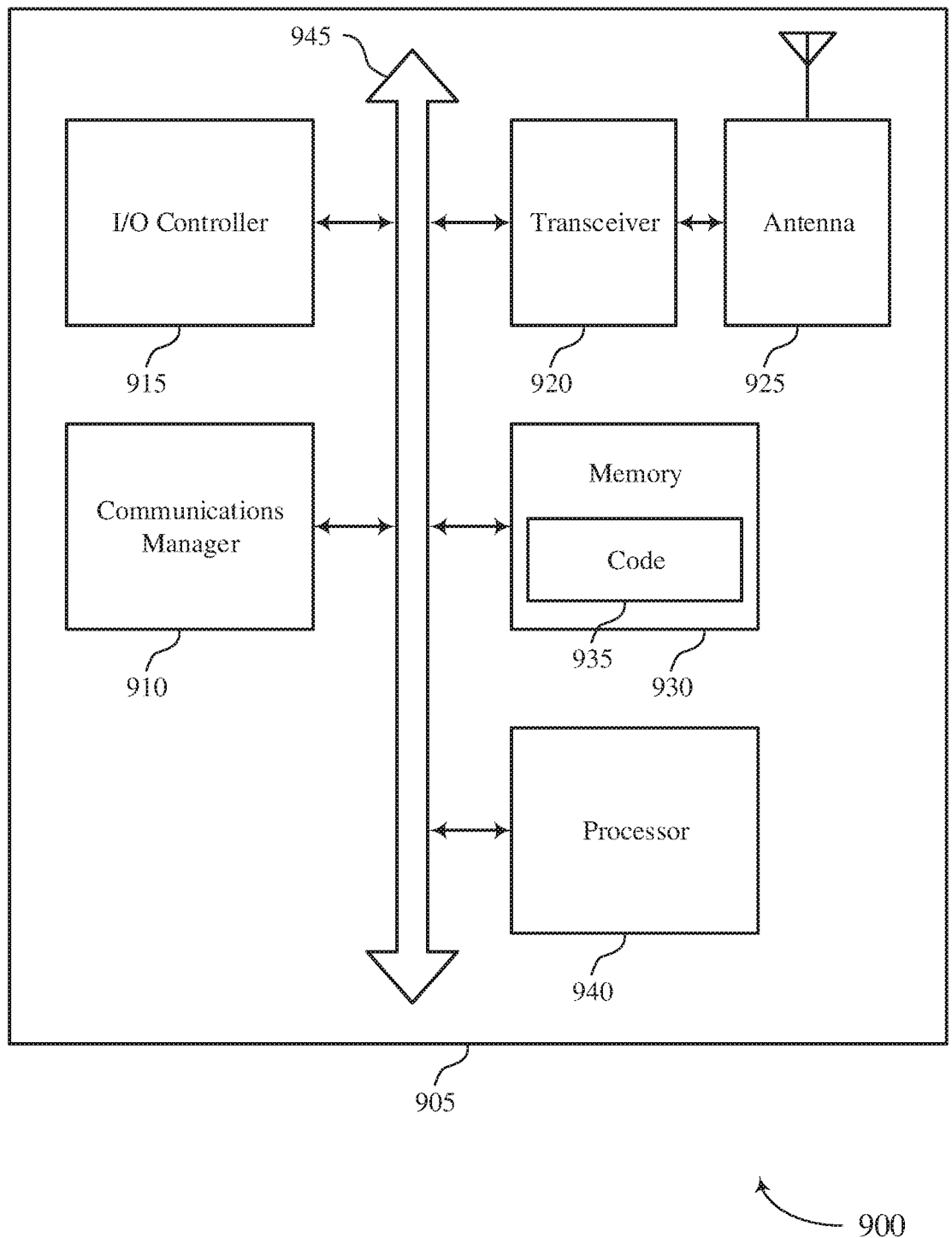
FIG. 9 shows a diagram of a system including a device that supports generating and steering OAM beams in accordance with aspects of the present disclosure.

FIG. 9 shows a diagram of a system 900 including a device 905 that supports generating and steering OAM beams in accordance with aspects of the present disclosure. The device 905 may be an example of or include the components of device 605, device 705, or a device as described herein. The device 905 may include components for bi-directional voice and data communications including components for transmitting and receiving communications, including a communications manager 910, an I/O controller 915, a transceiver 920, an antenna 925, memory 930, a processor 940, and a coding manager 950. These components may be in electronic communication or coupled via one or more buses (e.g., bus 945).

In some implementations, the communications manager 910 may determine a first ring area based on an angular direction over which the first device can communicate with a second device using an OAM beam, where the angular direction is relative to a planar array including a set of antenna elements and the first ring area is oriented at the angular direction, select a set of antenna elements from the set of antenna elements based on the first ring area, and transmit, to the second device, the OAM beam via the set of antenna elements according to the angular direction.

In some other implementations, the communications manager 910 may determine a first ring area based on an angular direction over which the first device can communicate with a second device using an OAM beam, where the angular direction is relative to a planar array including a set of antenna elements and the first ring area is oriented at the angular direction, select a set of antenna elements from the set of antenna elements based on the first ring area, and receive, from the second device, the OAM beam via the set of antenna elements according to the angular direction.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting generating and steering OAM beams).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
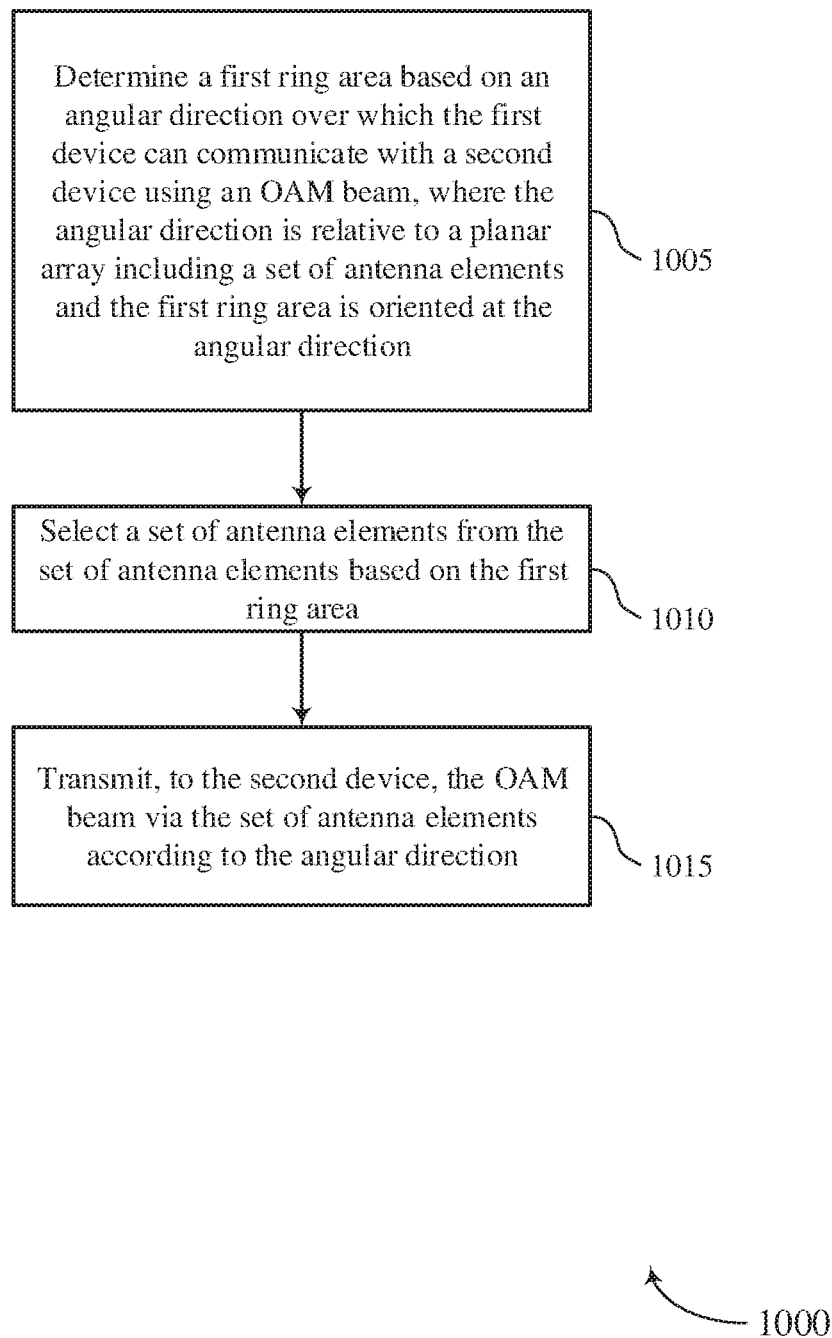
FIGS. 10 through 15 show flowcharts illustrating methods that support generating and steering OAM beams in accordance with aspects of the present disclosure.

FIG. 10 shows a flowchart illustrating a method 1000 that supports generating and steering OAM beams in accordance with aspects of the present disclosure. The operations of method 1000 may be implemented by a device or its components as described herein. For example, the operations of method 1000 may be performed by a communications manager as described with reference to FIGS. 6 through 9. In some examples, a device may execute a set of instructions to control the functional elements of the device to perform the functions described herein. Additionally or alternatively, a device may perform aspects of the functions described herein using special-purpose hardware.

At 1005, the device may determine a first ring area based on an angular direction over which the first device can communicate with a second device using an OAM beam, where the angular direction is relative to a planar array including a set of antenna elements and the first ring area is oriented at the angular direction. The operations of 1005 may be performed according to the methods described herein. In some examples, aspects of the operations of 1005 may be performed by an antenna selection component as described with reference to FIGS. 6 through 9.

At 1010, the device may select a set of antenna elements from the set of antenna elements based on the first ring area. The operations of 1010 may be performed according to the methods described herein. In some examples, aspects of the operations of 1010 may be performed by an antenna selection component as described with reference to FIGS. 6 through 9.

At 1015, the device may transmit, to the second device, the OAM beam via the set of antenna elements according to the angular direction. The operations of 1015 may be performed according to the methods described herein. In some examples, aspects of the operations of 1015 may be performed by an OAM beam component as described with reference to FIGS. 6 through 9.

Figure 11:
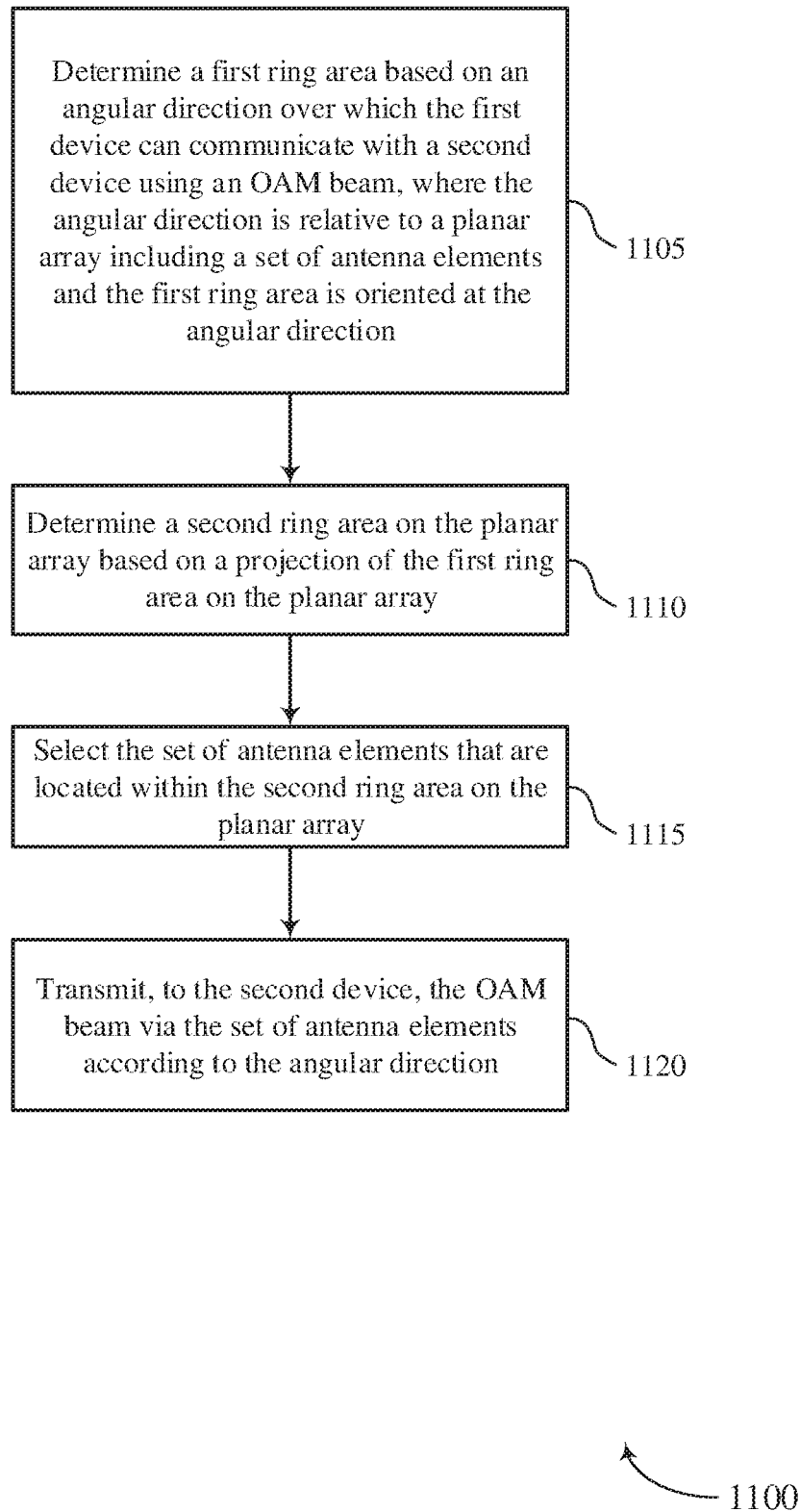

FIG. 11 shows a flowchart illustrating a method 1100 that supports generating and steering OAM beams in accordance with aspects of the present disclosure. The operations of method 1100 may be implemented by a device or its components as described herein. For example, the operations of method 1100 may be performed by a communications manager as described with reference to FIGS. 6 through 9. In some examples, a device may execute a set of instructions to control the functional elements of the device to perform the functions described herein. Additionally or alternatively, a device may perform aspects of the functions described herein using special-purpose hardware.

At 1105, the device may determine a first ring area based on an angular direction over which the first device can communicate with a second device using an OAM beam, where the angular direction is relative to a planar array including a set of antenna elements and the first ring area is oriented at the angular direction. The operations of 1105 may be performed according to the methods described herein. In some examples, aspects of the operations of 1105 may be performed by an antenna selection component as described with reference to FIGS. 6 through 9.

At 1110, the device may determine a second ring area on the planar array based on a projection of the first ring area on the planar array. The operations of 1110 may be performed according to the methods described herein. In some examples, aspects of the operations of 1110 may be performed by an antenna selection component as described with reference to FIGS. 6 through 9.

At 1115, the device may select the set of antenna elements that are located within the second ring area on the planar array. The operations of 1115 may be performed according to the methods described herein. In some examples, aspects of the operations of 1115 may be performed by an antenna selection component as described with reference to FIGS. 6 through 9.

At 1120, the device may transmit, to the second device, the OAM beam via the set of antenna elements according to the angular direction. The operations of 1120 may be performed according to the methods described herein. In some examples, aspects of the operations of 1120 may be performed by an OAM beam component as described with reference to FIGS. 6 through 9.

Figure 12:
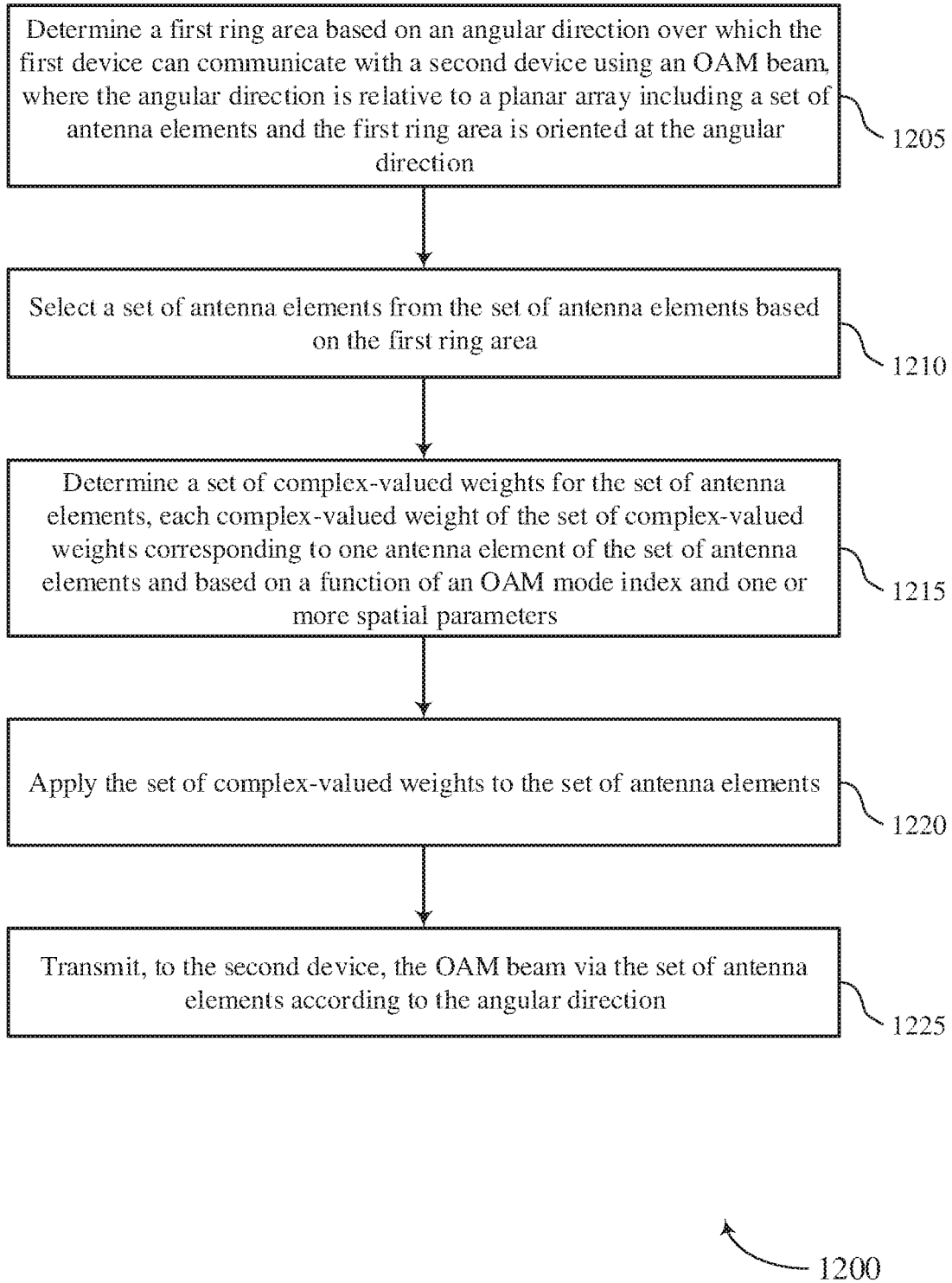

FIG. 12 shows a flowchart illustrating a method 1200 that supports generating and steering OAM beams in accordance with aspects of the present disclosure. The operations of method 1200 may be implemented by a device or its components as described herein. For example, the operations of method 1200 may be performed by a communications manager as described with reference to FIGS. 6 through 9. In some examples, a device may execute a set of instructions to control the functional elements of the device to perform the functions described herein. Additionally or alternatively, a device may perform aspects of the functions described herein using special-purpose hardware.

At 1205, the device may determine a first ring area based on an angular direction over which the first device can communicate with a second device using an OAM beam, where the angular direction is relative to a planar array including a set of antenna elements and the first ring area is oriented at the angular direction. The operations of 1205 may be performed according to the methods described herein. In some examples, aspects of the operations of 1205 may be performed by an antenna selection component as described with reference to FIGS. 6 through 9.

At 1210, the device may select a set of antenna elements from the set of antenna elements based on the first ring area. The operations of 1210 may be performed according to the methods described herein. In some examples, aspects of the operations of 1210 may be performed by an antenna selection component as described with reference to FIGS. 6 through 9.

At 1215, the device may determine a set of complex-valued weights for the set of antenna elements, each complex-valued weight of the set of complex-valued weights corresponding to one antenna element of the set of antenna elements and based on a function of an OAM mode index and one or more spatial parameters. The operations of 1215 may be performed according to the methods described herein. In some examples, aspects of the operations of 1215 may be performed by an antenna weight component as described with reference to FIGS. 6 through 9.

At 1220, the device may apply the set of complex-valued weights to the set of antenna elements. The operations of 1220 may be performed according to the methods described herein. In some examples, aspects of the operations of 1220 may be performed by an antenna weight component as described with reference to FIGS. 6 through 9.

At 1225, the device may transmit, to the second device, the OAM beam via the set of antenna elements according to the angular direction. The operations of 1225 may be performed according to the methods described herein. In some examples, aspects of the operations of 1225 may be performed by an OAM beam component as described with reference to FIGS. 6 through 9.

Figure 13:
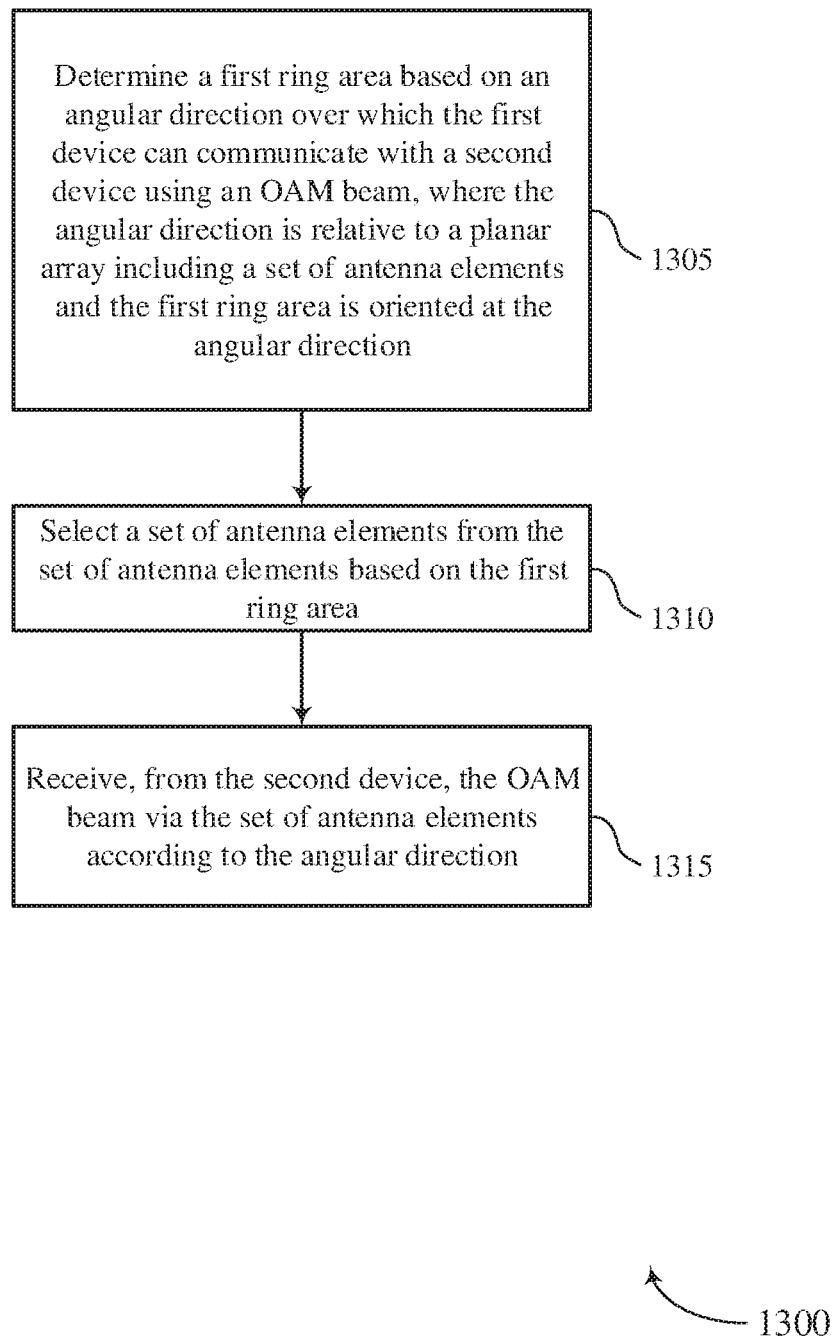

FIG. 13 shows a flowchart illustrating a method 1300 that supports generating and steering OAM beams in accordance with aspects of the present disclosure. The operations of method 1300 may be implemented by a device or its components as described herein. For example, the operations of method 1300 may be performed by a communications manager as described with reference to FIGS. 6 through 9. In some examples, a device may execute a set of instructions to control the functional elements of the device to perform the functions described herein. Additionally or alternatively, a device may perform aspects of the functions described herein using special-purpose hardware.

At 1305, the device may determine a first ring area based on an angular direction over which the first device can communicate with a second device using an OAM beam, where the angular direction is relative to a planar array including a set of antenna elements and the first ring area is oriented at the angular direction. The operations of 1305 may be performed according to the methods described herein. In some examples, aspects of the operations of 1305 may be performed by an antenna selection component as described with reference to FIGS. 6 through 9.

At 1310, the device may select a set of antenna elements from the set of antenna elements based on the first ring area. The operations of 1310 may be performed according to the methods described herein. In some examples, aspects of the operations of 1310 may be performed by an antenna selection component as described with reference to FIGS. 6 through 9.

At 1315, the device may receive, from the second device, the OAM beam via the set of antenna elements according to the angular direction. The operations of 1315 may be performed according to the methods described herein. In some examples, aspects of the operations of 1315 may be performed by an OAM beam component as described with reference to FIGS. 6 through 9.

Figure 14:
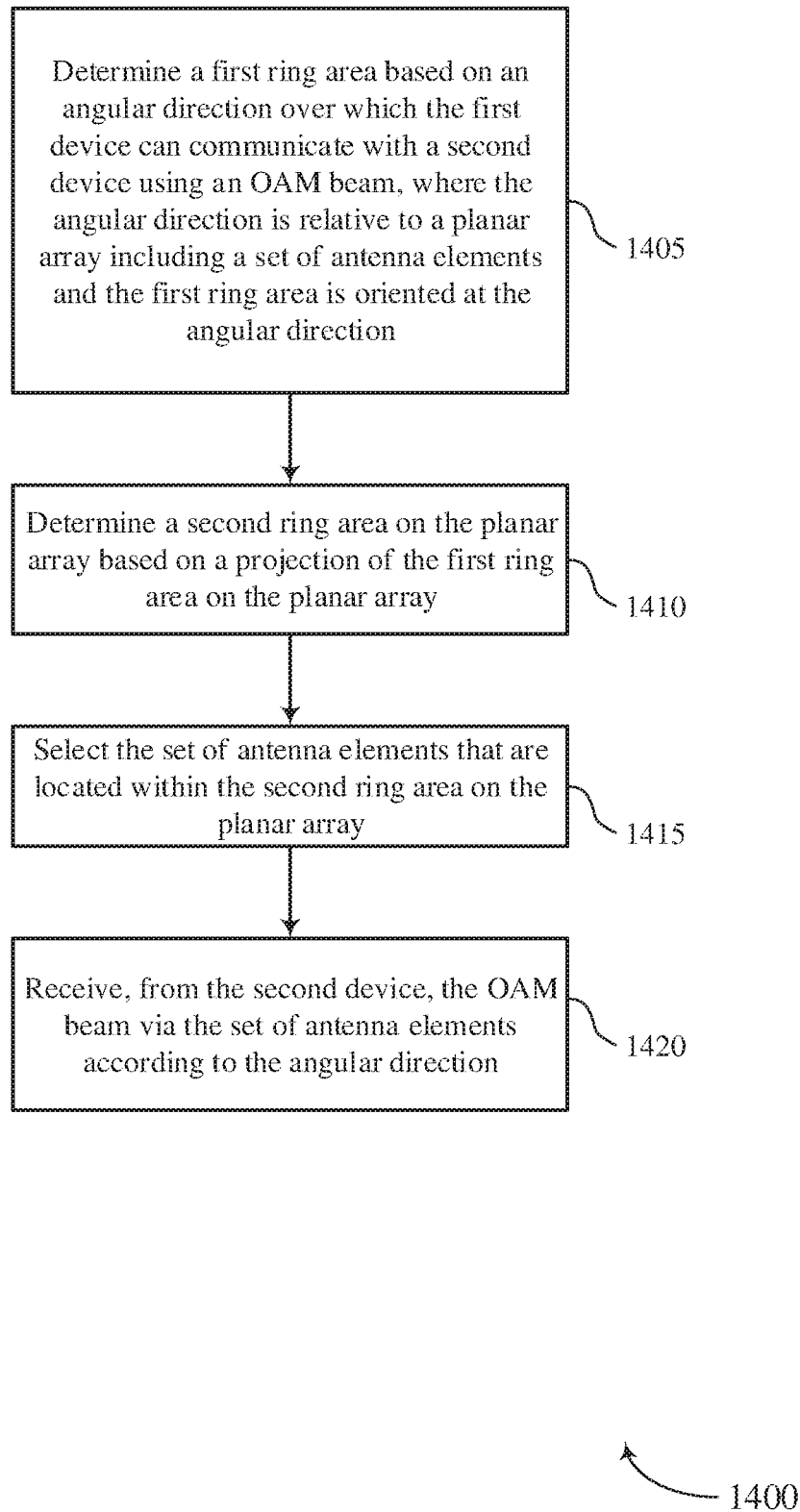

FIG. 14 shows a flowchart illustrating a method 1400 that supports generating and steering OAM beams in accordance with aspects of the present disclosure. The operations of method 1400 may be implemented by a device or its components as described herein. For example, the operations of method 1400 may be performed by a communications manager as described with reference to FIGS. 6 through 9. In some examples, a device may execute a set of instructions to control the functional elements of the device to perform the functions described herein. Additionally or alternatively, a device may perform aspects of the functions described herein using special-purpose hardware.

At 1405, the device may determine a first ring area based on an angular direction over which the first device can communicate with a second device using an OAM beam, where the angular direction is relative to a planar array including a set of antenna elements and the first ring area is oriented at the angular direction. The operations of 1405 may be performed according to the methods described herein. In some examples, aspects of the operations of 1405 may be performed by an antenna selection component as described with reference to FIGS. 6 through 9.

At 1410, the device may determine a second ring area on the planar array based on a projection of the first ring area on the planar array. The operations of 1410 may be performed according to the methods described herein. In some examples, aspects of the operations of 1410 may be performed by an antenna selection component as described with reference to FIGS. 6 through 9.

At 1415, the device may select the set of antenna elements that are located within the second ring area on the planar array. The operations of 1415 may be performed according to the methods described herein. In some examples, aspects of the operations of 1415 may be performed by an antenna selection component as described with reference to FIGS. 6 through 9.

At 1420, the device may receive, from the second device, the OAM beam via the set of antenna elements according to the angular direction. The operations of 1420 may be performed according to the methods described herein. In some examples, aspects of the operations of 1420 may be performed by an OAM beam component as described with reference to FIGS. 6 through 9.

Figure 15:
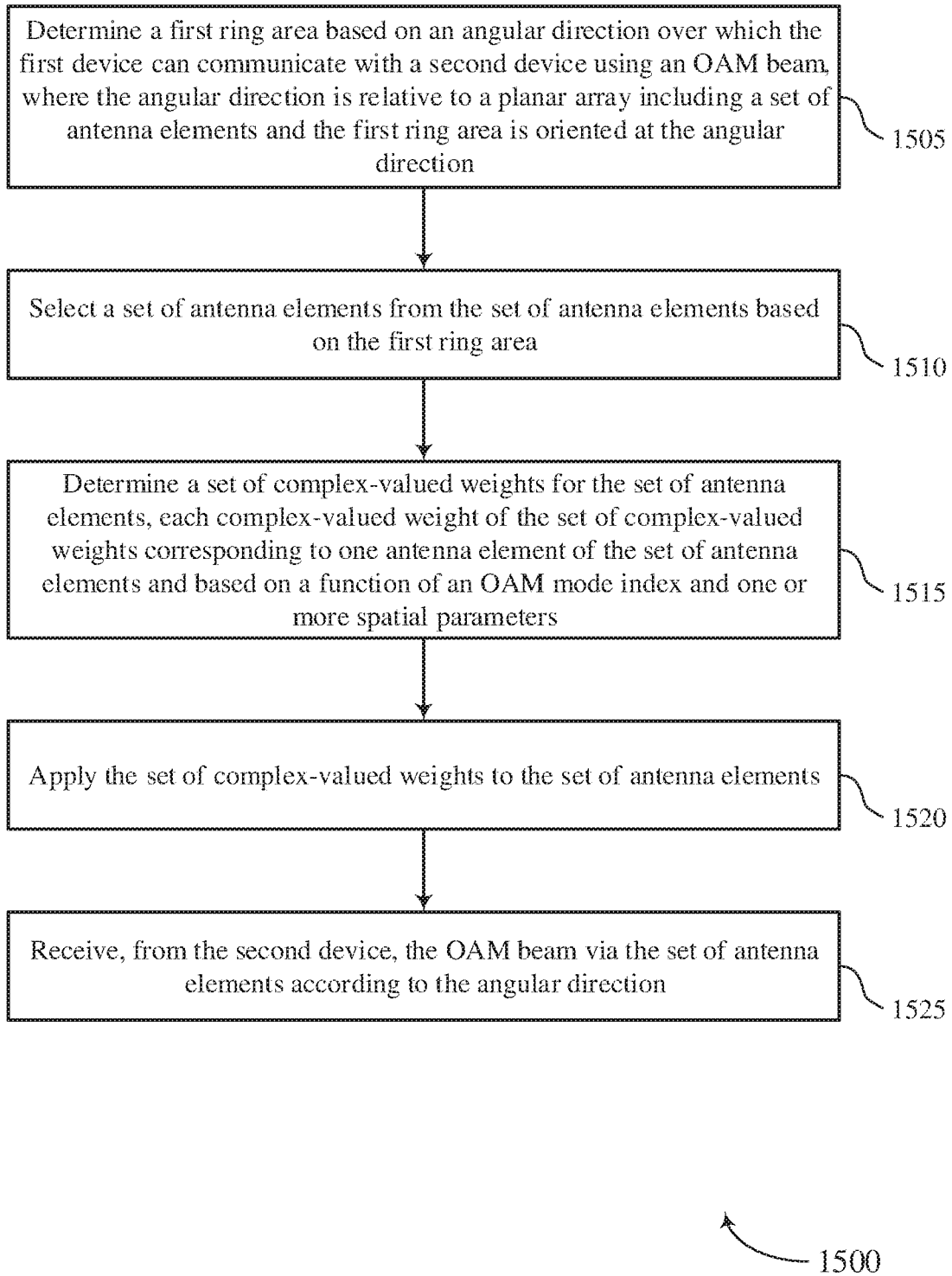

FIG. 15 shows a flowchart illustrating a method 1500 that supports generating and steering OAM beams in accordance with aspects of the present disclosure. The operations of method 1500 may be implemented by a device or its components as described herein. For example, the operations of method 1500 may be performed by a communications manager as described with reference to FIGS. 6 through 9. In some examples, a device may execute a set of instructions to control the functional elements of the device to perform the functions described herein. Additionally or alternatively, a device may perform aspects of the functions described herein using special-purpose hardware.

At 1505, the device may determine a first ring area based on an angular direction over which the first device can communicate with a second device using an OAM beam, where the angular direction is relative to a planar array including a set of antenna elements and the first ring area is oriented at the angular direction. The operations of 1505 may be performed according to the methods described herein. In some examples, aspects of the operations of 1505 may be performed by an antenna selection component as described with reference to FIGS. 6 through 9.

At 1510, the device may select a set of antenna elements from the set of antenna elements based on the first ring area. The operations of 1510 may be performed according to the methods described herein. In some examples, aspects of the operations of 1510 may be performed by an antenna selection component as described with reference to FIGS. 6 through 9.

At 1515, the device may determine a set of complex-valued weights for the set of antenna elements, each complex-valued weight of the set of complex-valued weights corresponding to one antenna element of the set of antenna elements and based on a function of an OAM mode index and one or more spatial parameters. The operations of 1515 may be performed according to the methods described herein. In some examples, aspects of the operations of 1515 may be performed by an antenna weight component as described with reference to FIGS. 6 through 9.

At 1520, the device may apply the set of complex-valued weights to the set of antenna elements. The operations of 1520 may be performed according to the methods described herein. In some examples, aspects of the operations of 1520 may be performed by an antenna weight component as described with reference to FIGS. 6 through 9.

At 1525, the device may receive, from the second device, the OAM beam via the set of antenna elements according to the angular direction. The operations of 1525 may be performed according to the methods described herein. In some examples, aspects of the operations of 1525 may be performed by an OAM beam component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first device, comprising:
    determining a first ring area based at least in part on an angular direction over which the first device can communicate with a second device using an orbital angular momentum beam, wherein the angular direction is relative to a planar array comprising a plurality of antenna elements and the first ring area is oriented at the angular direction;
    determining a second ring area on the planar array based at least in part on a projection of the first ring area on the planar array;
    activating a set of antenna elements that are located within the second ring area on the planar array;
    deactivating a remainder of the plurality of antenna elements that are located outside of the second ring area on the planar array;
    and
    transmitting, to the second device, the orbital angular momentum beam via the set of antenna elements according to the angular direction.

2. The method of claim 1, wherein determining the second ring area on the planar array comprises:
    projecting the first ring area on the planar array based at least in part on the angular direction.

3. The method of claim 1, wherein the angular direction is equal to zero degrees, and wherein the second ring area comprises a circular ring area.

4. The method of claim 1, wherein the angular direction is equal to an angle different than zero degrees, and wherein the second ring area comprises an elliptical ring area.

5. The method of claim 1, further comprising:
    determining a set of complex-valued weights for the set of antenna elements, each complex-valued weight of the set of complex-valued weights corresponding to one antenna element of the set of antenna elements and based at least in part on a function of an orbital angular momentum mode index and one or more spatial parameters; and
    applying the set of complex-valued weights to the set of antenna elements, wherein transmitting the orbital angular momentum beam via the set of antenna elements is based at least in part on applying the set of complex-valued weights.

6. The method of claim 5, wherein the one or more spatial parameters for determining a complex-valued weight for an antenna element comprise one or more of:
    the angular direction;
    a distance between a projected location of the antenna element on the first ring area and a center of the first ring area;
    an angle measured about the center of the first ring area from a reference line of the first ring area to the projected location of the antenna element on the first ring area; or; and
    a wavelength of a signal transmitted using the orbital angular momentum beam.

7. The method of claim 1, wherein the first ring area is defined by an area between a first circle associated with a first radius and a second circle associated with a second radius different than the first radius.

8. The method of claim 1, wherein the planar array comprises a uniform planar array.

9. The method of claim 1, wherein the planar array comprises a multi-antenna array or an intelligent surface.

10. A method for wireless communication at a first device, comprising:

determining a first ring area based at least in part on an angular direction over which the first device can communicate with a second device using an orbital angular momentum beam, wherein the angular direction is relative to a planar array comprising a plurality of antenna elements and the first ring area is oriented at the angular direction;

determining a second ring area on the planar array based at least in part on a projection of the first ring area on the planar array;

activating a set of antenna elements that are located within the second ring area on the planar array;

deactivating a remainder of the plurality of antenna elements that are located outside of the second ring area on the planar array; and receiving, from the second device, the orbital angular momentum beam via the set of antenna elements according to the angular direction.

11. The method of claim 10, wherein determining the second ring area on the planar array comprises:

projecting the first ring area on the planar array based at least in part on the angular direction.

12. The method of claim 10, wherein the angular direction is equal to zero degrees, and wherein the second ring area comprises a circular ring area.

13. The method of claim 10, wherein the angular direction is equal to an angle different than zero degrees, and wherein the second ring area comprises an elliptical ring area.

14. The method of claim 10, further comprising:

determining a set of complex-valued weights for the set of antenna elements, each complex-valued weight of the set of complex-valued weights corresponding to one antenna element of the set of antenna elements and based at least in part on a function of an orbital angular momentum mode index and one or more spatial parameters; and applying the set of complex-valued weights to the set of antenna elements, wherein receiving the orbital angular momentum beam via the set of antenna elements is based at least in part on applying the set of complex-valued weights.

15. The method of claim 14, wherein the one or more spatial parameters used for determining a complex-valued weight for an antenna element comprise one or more of:

the angular direction;

a distance between a projected location of the antenna element on the first ring area and a center of the first ring area;

an angle measured about the center of the first ring area from a reference line of the first ring area to the projected location of the antenna element on the first ring area; or; and a wavelength of a signal received using the orbital angular momentum beam.

16. The method of claim 10, wherein the first ring area is defined by an area between a first circle associated with a first radius and a second circle associated with a second radius different than the first radius.

17. The method of claim 10, wherein the planar array comprises a uniform planar array.

18. The method of claim 10, wherein the planar array comprises a multi-antenna array or an intelligent surface.

19. An apparatus for wireless communication at a first device, comprising a processor, memory coupled to the processor; and instructions stored in the memory and executable by the processor to cause the apparatus to:

determine a first ring area based at least in part on an angular direction over which the first device can communicate with a second device using an orbital angular momentum beam, wherein the angular direction is relative to a planar array comprising a plurality of antenna elements and the first ring area is oriented at the angular direction;

determine a second ring area on the planar array based at least in part on a projection of the first ring area on the planar array;

activate a set of antenna elements that are located within the second ring area on the planar array;

deactivate a remainder of the plurality of antenna elements that are located outside of the second ring area on the planar array; and transmit, to the second device, the orbital angular momentum beam via the set of antenna elements according to the angular direction.

20. The apparatus of claim 19, wherein the instructions to determine the second ring area on the planar array are executable by the processor to cause the apparatus to:

project the first ring area on the planar array based at least in part on the angular direction.

21. The apparatus of claim 19, wherein the angular direction is equal to zero degrees, and wherein the second ring area comprises a circular ring area.

22. The apparatus of claim 19, wherein the angular direction is equal to an angle different than zero degrees, and wherein the second ring area comprises an elliptical ring area.

23. The apparatus of claim 19, wherein the instructions are further executable by the processor to cause the apparatus to:

determine a set of complex-valued weights for the set of antenna elements, each complex-valued weight of the set of complex-valued weights corresponding to one antenna element of the set of antenna elements and based at least in part on a function of an orbital angular momentum mode index and one or more spatial parameters; and apply the set of complex-valued weights to the set of antenna elements, wherein transmitting the orbital angular momentum beam via the set of antenna elements is based at least in part on applying the set of complex-valued weights.

24. The apparatus of claim 23, wherein the one or more spatial parameters for determining a complex-valued weight for an antenna element comprise one or more of:

the angular direction;

a distance between a projected location of the antenna element on the first ring area and a center of the first ring area;

an angle measured about the center of the first ring area from a reference line of the first ring area to the projected location of the antenna element on the first ring area; or; and a wavelength of a signal transmitted using the orbital angular momentum beam.

25. The apparatus of claim 19, wherein the first ring area is defined by an area between a first circle associated with a first radius and a second circle associated with a second radius different than the first radius.

26. The apparatus of claim 19, wherein the planar array comprises a uniform planar array.

27. The apparatus of claim 19, wherein the planar array comprises a multi-antenna array or an intelligent surface.

28. An apparatus for wireless communication at a first device, comprising a processor, memory coupled to the processor; and instructions stored in the memory and executable by the processor to cause the apparatus to:
  determine a first ring area based at least in part on an angular direction over which the first device can communicate with a second device using an orbital angular momentum beam, wherein the angular direction is relative to a planar array comprising a plurality of antenna elements and the first ring area is oriented at the angular direction;
  determine a second ring area on the planar array based at least in part on a projection of the first ring area on the planar array;
  activate a set of antenna elements that are located within the second ring area on the planar array;
  deactivate a remainder of the plurality of antenna elements that are located outside of the second ring area on the planar array; and
  receive, from the second device, the orbital angular momentum beam via the set of antenna elements according to the angular direction.

29. The apparatus of claim 28, wherein the instructions to determine the second ring area on the planar array are executable by the processor to cause the apparatus to:
  project the first ring area on the planar array based at least in part on the angular direction.

30. The apparatus of claim 28, wherein the angular direction is equal to zero degrees, and wherein the second ring area comprises a circular ring area.

31. The apparatus of claim 28, wherein the angular direction is equal to an angle different than zero degrees, and wherein the second ring area comprises an elliptical ring area.

32. The apparatus of claim 28, wherein the instructions are further executable by the processor to cause the apparatus to:
  determine a set of complex-valued weights for the set of antenna elements, each complex-valued weight of the set of complex-valued weights corresponding to one antenna element of the set of antenna elements and based at least in part on a function of an orbital angular momentum mode index and one or more spatial parameters; and
  apply the set of complex-valued weights to the set of antenna elements, wherein receiving the orbital angular momentum beam via the set of antenna elements is based at least in part on applying the set of complex-valued weights.

33. The apparatus of claim 32, wherein the one or more spatial parameters for determining a complex-valued weight for an antenna element comprise one or more of:
  the angular direction;
  a distance between a projected location of the antenna element on the first ring area and a center of the first ring area;
  an angle measured about the center of the first ring area from a reference line of the first ring area to the projected location of the antenna element on the first ring area; or; and
  a wavelength of a signal received using the orbital angular momentum beam.

34. The apparatus of claim 28, wherein the first ring area is defined by an area between a first circle associated with a first radius and a second circle associated with a second radius different than the first radius.

35. The apparatus of claim 28, wherein the planar array comprises a uniform planar array.

36. The apparatus of claim 28, wherein the planar array comprises a multi-antenna array or an intelligent surface.

37. An apparatus for wireless communication at a first device, comprising:
  means for determining a first ring area based at least in part on an angular direction over which the first device can communicate with a second device using an orbital angular momentum beam, wherein the angular direction is relative to a planar array comprising a plurality of antenna elements and the first ring area is oriented at the angular direction;
  means for determining a second ring area on the planar array based at least in part on a projection of the first ring area on the planar array;
  means for activating a set of antenna elements that are located within the second ring area on the planar array;
  means for deactivating a remainder of the plurality of antenna elements that are located outside of the second ring area on the planar array; and
  means for transmitting, to the second device, the orbital angular momentum beam via the set of antenna elements according to the angular direction.

38. A non-transitory computer-readable medium storing code for wireless communication at a first device, the code comprising instructions executable by a processor to:
  determine a first ring area based at least in part on an angular direction over which the first device can communicate with a second device using an orbital angular momentum beam, wherein the angular direction is relative to a planar array comprising a plurality of antenna elements and the first ring area is oriented at the angular direction;
  determine a second ring area on the planar array based at least in part on a projection of the first ring area on the planar array;
  activate a set of antenna elements that are located within the second ring area on the planar array;
  deactivate a remainder of the plurality of antenna elements that are located outside of the second ring area on the planar array; and
  receive, from the second device, the orbital angular momentum beam via the set of antenna elements according to the angular direction.

39. An apparatus for wireless communication at a first device, comprising a processor, memory coupled to the processor; and instructions stored in the memory and executable by the processor to cause the apparatus to:
  determine a first ring area based at least in part on an angular direction over which the first device can communicate with a second device using an orbital angular momentum beam, wherein the angular direction is relative to a planar array comprising a plurality of antenna elements and the first ring area is oriented at the angular direction;
  select a set of antenna elements from the plurality of antenna elements based at least in part on the first ring area;
  transmit, to the second device, the orbital angular momentum beam via the set of antenna elements according to the angular direction;
  determine a set of complex-valued weights for the set of antenna elements, each complex-valued weight of the set of complex-valued weights corresponding to one antenna element of the set of antenna elements and based at least in part on a function of an orbital angular momentum mode index and one or more spatial parameters; and apply the set of complex-valued weights to the set of antenna elements, wherein transmitting the orbital angular momentum beam via the set of antenna elements is based at least in part on applying the set of complex-valued weights.

40. The apparatus of claim 39, wherein the one or more spatial parameters for determining a complex-valued weight for an antenna element comprise one or more of:

the angular direction;

a distance between a projected location of the antenna element on the first ring area and a center of the first ring area;

an angle measured about the center of the first ring area from a reference line of the first ring area to the projected location of the antenna element on the first ring area; or; and a wavelength of a signal transmitted using the orbital angular momentum beam.

41. An apparatus for wireless communication at a first device, comprising a processor, memory coupled to the processor; and instructions stored in the memory and executable by the processor to cause the apparatus to:

determine a first ring area based at least in part on an angular direction over which the first device can communicate with a second device using an orbital angular momentum beam, wherein the angular direction is relative to a planar array comprising a plurality of antenna elements and the first ring area is oriented at the angular direction;

select a set of antenna elements from the plurality of antenna elements based at least in part on the first ring area;

receive, from the second device, the orbital angular momentum beam via the set of antenna elements according to the angular direction;

determine a set of complex-valued weights for the set of antenna elements, each complex-valued weight of the set of complex-valued weights corresponding to one antenna element of the set of antenna elements and based at least in part on a function of an orbital angular momentum mode index and one or more spatial parameters; and apply the set of complex-valued weights to the set of antenna elements, wherein receiving the orbital angular momentum beam via the set of antenna elements is based at least in part on applying the set of complex-valued weights.

42. The apparatus of claim 41, wherein the one or more spatial parameters for determining a complex-valued weight for an antenna element comprise one or more of:

the angular direction;

a distance between a projected location of the antenna element on the first ring area and a center of the first ring area;

an angle measured about the center of the first ring area from a reference line of the first ring area to the projected location of the antenna element on the first ring area; or; and a wavelength of a signal received using the orbital angular momentum beam.

* * * * *